US012782930B2

(12) United States Patent
Iskandar et al.

(10) Patent No.: US 12,782,930 B2

(45) Date of Patent: Nov. 3, 2026

(54) INTEGRATED HYBRID PREDICTIVE MONITORING OF MANUFACTURING SYSTEMS

(71) Applicant: Applied Materials, Inc., Santa Clara, CA (US)

(72) Inventors: Jimmy Iskandar, Fremont, CA (US); Fei Li, Houston, TX (US); Arvind Shankar Raman, Austin, TX (US); James Robert Moyne, Canton, MI (US); Eda Tuncel, Menlo Park, CA (US); Michael Armacost, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 511 days.

(21) Appl. No.: 18/341,650

(22) Filed: Jun. 26, 2023

(65) Prior Publication Data

US 2024/0427324 A1 Dec. 26, 2024

(51) Int. Cl.
*G05B 23/02* (2006.01)

(52) U.S. Cl.
CPC ..... *G05B 23/0283* (2013.01); *G05B 23/0272* (2013.01)

(58) Field of Classification Search
CPC ............ G05B 23/0283; G05B 23/0272; G05B 23/0254
See application file for complete search history.

(56) References Cited

U.S. PATENT DOCUMENTS

| | | | | |
|---|---|---|---|---|
| 8,781,982 | B1 | 7/2014 | Das et al. | |
| 11,308,366 | B2 * | 4/2022 | Kim | G06N 3/098 |
| 11,348,813 | B2 * | 5/2022 | Liao | G05B 23/024 |
| 2017/0023927 | A1 * | 1/2017 | Kaushal | G05B 19/4065 |
| 2018/0047599 | A1 * | 2/2018 | Chiang | G01R 19/16576 |
| 2018/0267519 | A1 * | 9/2018 | Ferry | G05B 19/41875 |
| 2018/0267521 | A1 * | 9/2018 | Ferry | G06Q 10/06395 |
| 2020/0210968 | A1 * | 7/2020 | Mojtahedzadeh | G06Q 10/00 |

(Continued)

FOREIGN PATENT DOCUMENTS

| | | | | |
|---|---|---|---|---|
| CN | 109791401 B * | 7/2022 | | G06N 7/01 |
| JP | 7268123 B2 | 5/2023 | | |

OTHER PUBLICATIONS

Machine translation of CN109791401B (Year: 2002).*

(Continued)

*Primary Examiner* — Lee E Rodak
*Assistant Examiner* — Sangkyung Lee
(74) *Attorney, Agent, or Firm* — Lowenstein Sandler LLP

(57) ABSTRACT

Implementations relate to techniques of monitoring conditions of tools used in device manufacturing systems. The techniques include storing a failure index (FI) model generated using run-time sensor data that was collected during operations of a tool that occurred prior to a low number of failures of the tool or even before any such failures occur. The FI model includes an FI function of the run-time sensor data and FI threshold value(s) associated with conditions of the tool. The techniques further include collecting new run-time sensor data and applying the FI model to the new run-time sensor data to identify one or more conditions associated with the tool. The techniques further include updating the FI model responsive to one or more tool failures.

18 Claims, 13 Drawing Sheets

200

(56) References Cited

U.S. PATENT DOCUMENTS

| | | | |
|---|---|---|---|
| 2020/0379454 | A1 | 12/2020 | Trinh et al. |
| 2022/0172069 | A1 | 6/2022 | Kim et al. |
| 2022/0326684 | A1 | 10/2022 | Shirouzu |

OTHER PUBLICATIONS

Zhao et al, "An Adaptive Modeling Framework for Bearing Failure Prediction," https://www.mdpi.com/journal/electronics, Nov. 19, 2021, 13 pages.

Wang et al, "Adaptive Particle Filter-Based Approach for RUL Prediction Under Uncertain Varying Stresses With Application to HDD," IEEE Transactions on Industrial Informatics, vol. 17, No. 9, Sep. 2021, 10 pages.

International Search Report and Written Opinion for International Application No. PCT/US2024/035119, mailed Oct. 10, 2024, 11 pages.

* cited by examiner

470

INTEGRATED HYBRID PREDICTIVE MONITORING OF MANUFACTURING SYSTEMS

TECHNICAL FIELD

This instant specification generally relates to quality control in electronic device manufacturing, including semiconductor processing lines. More specifically, the instant specification relates to monitoring remaining useful life of various processing tools used in semiconductor manufacturing.

BACKGROUND

Manufacturing of modern materials often involves various deposition techniques, such as chemical vapor deposition (CVD) or physical vapor deposition (PVD) techniques, in which atoms or molecules of one or more selected types are deposited on a wafer (substrate) held in low or high vacuum environments that are provided by vacuum processing (e.g., deposition, etching, etc.) chambers. Materials manufactured in this manner may include monocrystals, semiconductor films, fine coatings, and numerous other substances used in practical applications, such as electronic device manufacturing. Many of these applications depend on the purity and specifications of the materials grown in the processing chambers. The quality of such materials, in turn, depends on adherence of the manufacturing operations to correct process specifications. To maintain isolation of the inter-chamber environment and to minimize exposure of wafers to ambient atmosphere and contaminants, various sensor detection techniques are used to monitor processing chamber environment, wafer transportation, physical and chemical properties of the products, and the like. Improving precision, reliability, and efficiency of such monitoring presents a number of technological challenges whose successful resolution facilitates continuing progress of electronic device manufacturing and helps to meet the constantly increasing demands to the quality of the products of semiconductor device manufacturing.

SUMMARY

Figure 1:
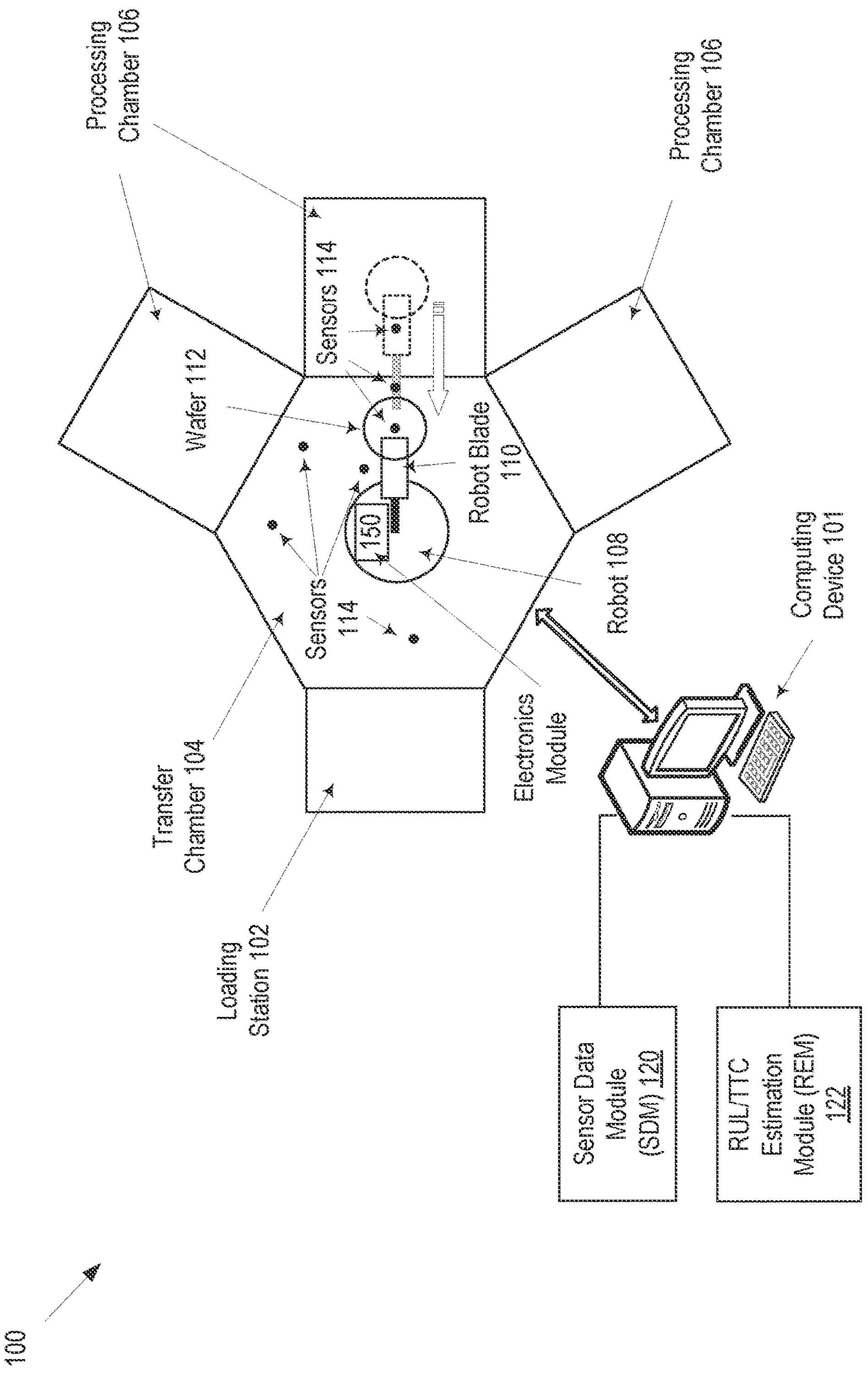
FIG. 1 illustrates one exemplary implementation of a manufacturing machine capable of deploying hybrid preventive maintenance that combines FI-based tool evaluation with accumulation of tool failure statistics, in accordance with some implementations of the present disclosure.

In one implementation, disclosed is a method that includes storing, by a processing device, a failure index (FI) model generated using run-time sensor data that was collected during one or more operations of a tool of a manufacturing system that occurred prior to first five failures of the tool. The FI model includes an FI function, an input into the FI function comprising the run-time sensor data, and one or more FI threshold values for the FI function, wherein each of the one or more FI threshold values is associated with at least one of a present condition of the tool or a projected condition of the tool. The method further includes collecting new run-time sensor data for one or more instances of the tool, and applying, by the processing device, the FI model to the new run-time sensor data to identify one or more conditions associated with each of the one or more instances of the tool. The method further includes, responsive to one or more tool failures of the one or more instances of the tool, updating the FI model. Updating the FI model includes modifying at least one of a dependence of the FI function on the run-time sensor data, or at least one FI threshold value of the one or more FI threshold values.

In another implementation, disclosed is a method that includes storing, by a processing device, a failure index (FI) model generated using run-time sensor data that was collected during one or more operations of a tool of a manufacturing system that occurred prior to a first failure of the tool. The FI model includes an FI function, an input into the FI function comprising the run-time sensor data, and one or more FI threshold values for the FI function, wherein each of the one or more FI threshold values is associated with at least one of a present condition of the tool or a projected condition of the tool. The method further includes collecting new run-time sensor data for one or more instances of the tool and applying the FI model to the new run-time sensor data to identify one or more conditions associated with each of the one or more instances of the tool.

In another implementation, disclosed is a system that includes a memory and a processing device operatively coupled to the memory. The processing device is to store a failure index (FI) model generated using run-time sensor data that was collected during one or more operations of a tool of a manufacturing system that occurred prior to first five failures of the tool. The FI model includes an FI function, an input into the FI function comprising the run-time sensor data, and one or more FI threshold values for the FI function, wherein each of the one or more FI threshold values is associated with at least one of a present condition of the tool or a projected condition of the tool. The processing device is further to collect new run-time sensor data for one or more instances of the tool and apply the FI model to the new run-time sensor data to identify one or more conditions associated with each of the one or more instances of the tool. The processing device is further to update the FI model responsive to one or more tool failures of the one or more instances of the tool. Updating the FI model includes modifying at least one of a dependence of the FI function on the run-time sensor data, or at least one FI threshold value of the one or more FI threshold values.

DETAILED DESCRIPTION

The implementations disclosed herein provide for efficient monitoring of a state, including remaining useful life (RUL) or a time to some threshold condition (TTC), of various tools used in manufacturing of various products, including but not limited to semiconductor wafers, films, and/or fully or partially manufactured devices. The implementations disclosed herein provide for using available sensor data to estimate when a failure of various processing tools and/or processes is likely to happen, both in situations when a tool failure data is too scarce or not yet available and in situations when a substantial tool failure data has been accumulated. For example, the implementations disclosed herein can be used to estimate a current state of a particular tool (e.g., normal state, warning state, advanced state, etc.) and inform a manufacturing line controller about a likely RUL or TTC for the tool, and/or a time to a certain condition (e.g., a process stoppage), The robotic delivery and retrieval of wafers, as well as maintaining controlled environments in loading, processing, and transfer chambers improve speed, efficiency, and quality of device manufacturing. Typical device manufacturing processes often require tens and even hundreds of steps, such as introducing a gas into a processing chamber, heating the chamber environment, changing a composition of gas, purging a chamber, pumping the gas out, changing pressure, moving a wafer from one position to another, creating or adjusting a plasma environment, performing etching, polishing, and/or deposition steps, and so on. The very complexity of the manufacturing technology calls for processing of a constant stream of runtime data from various sensors placed within or near the manufacturing system. Such sensor may include temperature sensors, pressure sensors, chemical sensors, gas flow sensors, motion sensors, position sensor, optical sensors, and/or other types of sensors. The manufacturing system can deploy multiple sensors of the same (or similar) type distributed throughout various parts of the system. For example, a single processing chamber can have multiple chemical sensors detecting a concentration of chemical vapor at various locations within the processing chamber and can similarly have multiple temperature sensors monitoring a temperature distribution.

The collected sensor data, e.g., raw run-time trace data, statistical characteristics of the raw data, can inform a handler (a user, engineer, supervisor) of the processing line when a specific tool is about to fail. Automatic estimation of the state of various tools without the need to stop the processing line and manually inspect each tool (a slow and expensive operation) is advantageous for increasing the processing line output and ensuring that the output comports with applicable technological specifications. Existing approaches to correlating runtime statistics with the state of various tools include using artificial intelligence (AI), e.g., machine-learning models. Training reliable AI models, however, requires a considerable number of prior (historical) tool failure. Given that a given tool can have multiple designs and is capable of failing in multiple different ways (e.g., a polishing tool can break down, become deformed, lose abrasion, and so on), collecting an amount of statistics sufficient for successful training of the AI models can require waiting for many tool failures. Additionally, training the AI models is typically performed by data science specialists who may lack subject matter expertise (e.g., expertise in physics and chemistry of the relevant processes and phenomena). Integration of a feedback from subject matter specialists into data-driven AI training process requires significant developmental efforts and is uncommon and/or impractical.

Aspects and implementations of the present disclosure address these and other challenges of the existing tool maintenance technology by disclosing a hybrid monitoring framework that combines unsupervised (or minimally supervised) monitoring during early stages of tool deployment when tool failure data is not yet available or scarce with supervised monitoring as more tool failure data is being collected. Hybrid monitoring integrates subject matter expertise, for use in estimation of tools' RULs (or other TTCs) during early stages of tool deployment with data-driven prediction during later stages (e.g., after several tool lifecycles). In some embodiments, a set $\{X_j\}=X_1, X_2, \ldots$ of runtime data and/or statistical characteristics of that data (denoted herein generally as $X_j$) collected during manufacturing can be identified. The run-time data can include one or more quantities (sensor values) that are monitored during processing operations, e.g., temperature, pressure, concentration of plasma particles, density, various tool-specific metrics, and the like. The identified run-time data or their statistical characteristics can be used to define a failure index (FI) function $FI(\{X_j\})$, also referred to as FI herein, whose value is indicative of a likelihood that a specific tool is approaching the end of its RUL or some other TTC, e.g., a state where the tool is to be cleaned, re-charged, and/or undergo any other maintenance operation. In some embodiments, the FI can include a weighted sum $FI(\{X_j\})=\Sigma_j w_j (\Delta X_j)^{\beta_j}$, in which departures $\Delta X_j$ of various sensor data or statistical characteristics $X_j$ from their reference values (e.g., from specific values or from a range of values associated with a tool at the start of its lifecycle) are weighted with some predefined or learned weights $w_j$. In some embodiments, different departures $\Delta X_j$ can be taken to a power defined by a quantity-specific exponents $\beta_j$.

Initially, parameters of the FI can be set based on recommendations of subject-matter experts and/or based on expectations that certain metrics do not significantly deviate from their normal ranges. For example, if a particular sensor quantity $X_j$ associated with a new tool has an average value $\overline{X}_j$ and variance $\sigma_j$, a departure of this quantity from the average value beyond a certain range, e.g., $2\sigma_j$, $3\sigma_j$, etc., can increase steeply the FI function. E.g., the FI function may have a contribution $FI(X_j)=ReLU((X_j-\overline{X}_j)^2-(2\sigma_j)^2)$, where ReLU( ) is a rectified linear unit function, or some other suitable nonlinear function. Additionally, a set of thresholds $T_W$, $T_A$, etc., can be defined for the FI function to signal when a state of the tool changes. For example, as long as the tool is characterized by the failure index value FI such that $FI \le T_W$, the state of the tool can be determined as "normal," and no further action needs to be taken. As the tool ages and its FI exceeds a warning threshold $T_W$, e.g., $T_W < FI \le T_A$, the state of the system can be determined as "warning" and a notification can be generated to warn an operator of the processing line about the tool approaching the end of its RUL of some other TTC. With further operation of the tool, its FI further increases and exceeds another threshold $T_A$. Responsive to determining that $FI > T_A$, the state of the tool can be determined as "advanced" (or advanced deterioration) and another notification can be output to the operator. Furthermore, as described in more detail below, a projection of the RUL of the tool (or some other TTC) can be made. A RUL (or some other TTC) projection, as used herein, may refer to FI-based estimation of RUL (TTC) of the tool before a sufficient amount of the failure data has been collected for the tool(s) of the relevant type, e.g., where a number of tool failures is small (such as less than five, ten, etc.) or even zero. The projection can be made based on observed dynamics of the FI, such as a time dependence FI(t) leading to the advanced state. At later lifecycles of the tool, projection of the RUL (or some other TTC) may be replaced with a more accurate RUL (TTC) prediction. RUL (TTC) prediction, as used herein, may refer to estimation of the RUL (TTC) that is based on statistics for time dependence FI(t) collected for multiple (e.g., more than ten, twenty, etc.) instances of completed lifecycles of the tool (e.g., multiple failures of the tool and/or terminal tool replacements).

The advantages of the disclosed techniques include (but are not limited to) a timely identification of different states of degradation of various tools that are deployed in manufacturing processing systems and are hard or inefficient to monitor without stopping the manufacturing line. Additional benefits include an ability to identify a quality of a maintenance operation performed for the tool. The disclosed implementations pertain to a variety of manufacturing techniques that use processing chambers (that may include deposition chambers, etching chambers, and the like), such as chemical vapor deposition techniques (CVD), physical vapor deposition (PVD), plasma-enhanced CVD, plasma-enhanced PVD, sputter deposition, atomic layer CVD, combustion CVD, catalytic CVD, evaporation deposition, molecular-beam epitaxy techniques, and so on. The disclosed implementations may be employed in techniques that use vacuum deposition chambers (e.g., ultrahigh vacuum CVD or PVD, low-pressure CVD, etc.) as well as in atmospheric pressure deposition chambers.

FIG. 1 illustrates one exemplary implementation of a manufacturing machine 100 capable of deploying hybrid preventive maintenance that combines FI-based tool evaluation with accumulation of tool failure statistics, in accordance with some implementations of the present disclosure. For example, the manufacturing machine 100 can be wafer fabrication equipment with various processing chambers. In one implementation, the manufacturing machine 100 includes a loading station (load-lock chamber) 102, a transfer chamber 104, and one or more processing chambers 106. The processing chamber(s) 106 may be interfaced to the transfer chamber 104 via transfer ports (not shown). The number of processing chamber(s) associated with the transfer chamber 104 may vary (with three processing chambers indicated in FIG. 1, as a way of example). Additionally, the design and shape of the transfer chamber 104 may vary. In the illustrated embodiment, the transfer chamber 104 has a hexagonal shape with each side being of approximately equal width. In other embodiments, the transfer chamber 104 may have four, five, seven, eight, or more sides. Additionally, different sides may have different widths or lengths. For example, the transfer chamber 104 may have four sides and be of rectangular shape or of square shape. In another example, the transfer chamber may have five sides and be of a wedge shape. As shown, each side of the transfer chamber 104 is connected to a single processing chamber 106. However, in other implementations one or more of the sides may be connected to multiple processing chambers. For example, a first side may be connected to two processing chambers, and a second side may be connected to one processing chamber.

The transfer chamber 104 may include a robot 108, a robot blade 110, and an optical inspection tool for accurate optical inspection of a wafer 112 that is being transported by the robot blade 110 after processing in one of the processing chambers 106. The transfer chamber 104 may be held under pressure (temperature) that is higher (or lower) than the atmospheric pressure (temperature). The robot blade 110 may be attached to an extendable arm sufficient to move the robot blade 110 into the processing chamber 106 to retrieve the wafer from the chamber after processing of the wafer is complete.

The robot blade 110 may enter the processing chamber(s) 106 through a slit valve port (not shown) while a lid to the processing chamber(s) 106 remains closed. The processing chamber(s) 106 may contain processing gases, plasma, and various particles used in deposition processes. A magnetic field may exist inside the processing chamber(s) 106. The inside of the processing chamber(s) 106 may be held at temperatures and pressures that are different from the temperature and pressure outside the processing chamber(s) 106.

The manufacturing machine 100 may deploy one or more sensors 114. Each sensor 114 may be a temperature sensor, pressure sensor, chemical detection sensor, chemical composition sensor, gas flow sensor, motion sensor, position sensor, optical sensor, or any and other type of sensors. Some or all of the sensors 114 may include a light source to produce light (or any other electromagnetic radiation), direct it towards a target, such as a component of the machine 100 or a wafer, a film deposited on the wafer, etc., and detect light reflected from the target. The sensors 114 can be located anywhere inside the manufacturing machine 100 (for example, within any of the chambers including the loading stations, on the robot 108, on the robot blade 110, between the chambers, and so one), or even outside the manufacturing machine 100 (where the sensors can test ambient temperature, pressure, gas concentration, and so on).

In some implementations, a computing device 101 may control operations of the manufacturing machine 100 and its various tools and components, including operations of the robot 108, operations that manage processes in the processing chambers 106, operations of the sensors 114, and so on. The computing device 101 may communicate with an electronics module 150 of the robot 108 and with the sensors 114. In some implementations, such communication may be performed wirelessly. The computing device 101 may control operations of the robot 108 and may also receive sensing data from the sensors 114, including raw sensors data or sensor data that undergoes preliminary processing (such as conversion from analog to digital format) by sensors 114 or by another processing device, such as a microcontroller of the electronics module 150 or any other processing device of the manufacturing machine 100. In some implementations, some of the sensor data is processed by the electronics module 150 whereas some of the sensor data is processed by the computing device 101. The computing device 101 may include a sensor data module (SDM) 120. The SDM 120 may activate sensors, deactivate sensors, place sensors in an idle state, change settings of the sensors, detect sensor hardware or software problems, and so on. In some implementations, SDM 120 may keep track of the processing operations performed by the manufacturing machine 100 and determine which sensors 114 are to be sampled for a particular processing (or diagnostic, maintenance, etc.) operation of the manufacturing machine 100. For example, during a chemical deposition step inside one of the processing chambers 106, SDM 120 may sample sensors 114 that are located inside the respective processing chamber 106 but not activate (or sample) sensors 114 located inside the transfer chamber 104 and/or the loading station 102. The raw data obtained by SDM 120 may include time series data where a specific sensor 114 captures or generates one or more readings of a detected quantity at a series of times. For example, a pressure sensor may generate N pressure readings $P(t_i)$ at times $t_1, t_2, \ldots t_N$. In some implementations, the raw data obtained by SDM 120 may include spatial maps at a predetermined set of spatial locations. For example, an optical reflectivity sensor may determine reflectivity of a film deposited on the surface of a wafer, $R(x_j, y_l)$, at a set (e.g., a two-dimensional set) of spatial locations $x_j, y_k$, on the surface of the film/wafer. In some implementations, both the time series and the spatial maps raw data can be collected. For example, as the film is being deposited on the wafer, SDM 120 can collect the reflectivity data from various locations on the surface of the film and at a set of consecutive instances of time, $R(t_i, x_j, y_l)$.

In some embodiments, SDM 120 may process the raw data (also referred as sensor values herein) obtained by sensors 114 and determine statistical characteristics of the obtained sensor values. For example, for each or some of the sensor values $S^{(a)}$, SDM 120 may determine one or more statistical characteristics $$X_j^{(a)}$$

of the respective sensor value $S^{(a)}$, such as a mean $$(\text{e.g., } X_1^{(a)}),$$

a median $$(\text{e.g., } X_2^{(a)}),$$

a mode $$(\text{e.g., } X_3^{(a)}),$$

an upper bound $$(\text{e.g., } X_4^{(a)}),$$

a lower bound $$(\text{e.g., } X_5^{(a)}),$$

a standard deviation $$(\text{e.g., } X_6^{(a)}),$$

a skewness $$(\text{e.g., } X_7^{(a)}),$$

a kurtosis $$(\text{e.g., } X_8^{(a)}),$$

or any further moments or cumulants of the data distribution. In various embodiments, only some of statistical characteristics $$X_j^{(a)}$$

may be used. In some embodiments, any additional value not listed above may be used. In some embodiments, at least some of the values $$X_j^{(a)}$$

may be raw data that is not statistically averaged. For example, temperature T and/or pressure P in the processing chamber may be taken at regular time intervals (e.g., one second) and not statistically processed. In some embodiments, SDM 120 may model (e.g., via regression analysis and/or some form of statistical fitting) the sensor values with various model distributions, e.g., the normal distribution, the log-normal distribution, the binomial distribution, Poisson's distribution, the Gamma distribution, or any other distribution. In such embodiments, the one or more parameters may include an identification of the fitting distribution being used together with the fitting parameters determined by SDM 120. In some embodiments, SDM 120 may use multiple distributions to fit the raw data from one sensor, e.g., a main distribution and a tail distribution for outlier data points.

The statistical characteristics obtained by SDM 120 and included into the FI function may be sensor-specific. For example, for some sensors a small number of values may be determined (e.g., only the mean, or the mean and the variance) whereas for other sensors more moments (e.g., skewness, kurtosis, etc.) may be determined. The computing device 101 may also include a remaining useful life estimation module (REM) 122 to process, aggregate, and analyze the statistics collected by SDM 120, as described in more details below, in reference to FIG. 3 and FIG. 4. More specifically, REM 122 may define, based on sensor data and statistics available via SDM 120, a suitable FI for evaluation of a tool(s) degradation. The parameters of the FI may be initially defined based on an input from subject matter experts. In some embodiments, as the tool failure data is collected, the parameters of the FI may be adjusted. During runtime, REM 122 may compute (e.g., periodically, during processing of each wafer, or each Nth wafer, etc.) the FI based on the collected statistics and may identify a current state of degradation of the tool(s) being monitored. REM 122 may also estimate, based on data collected by SDM 120 and/or FI computed by REM 122, a time to an expected failure of the tool(s).

Figure 2:
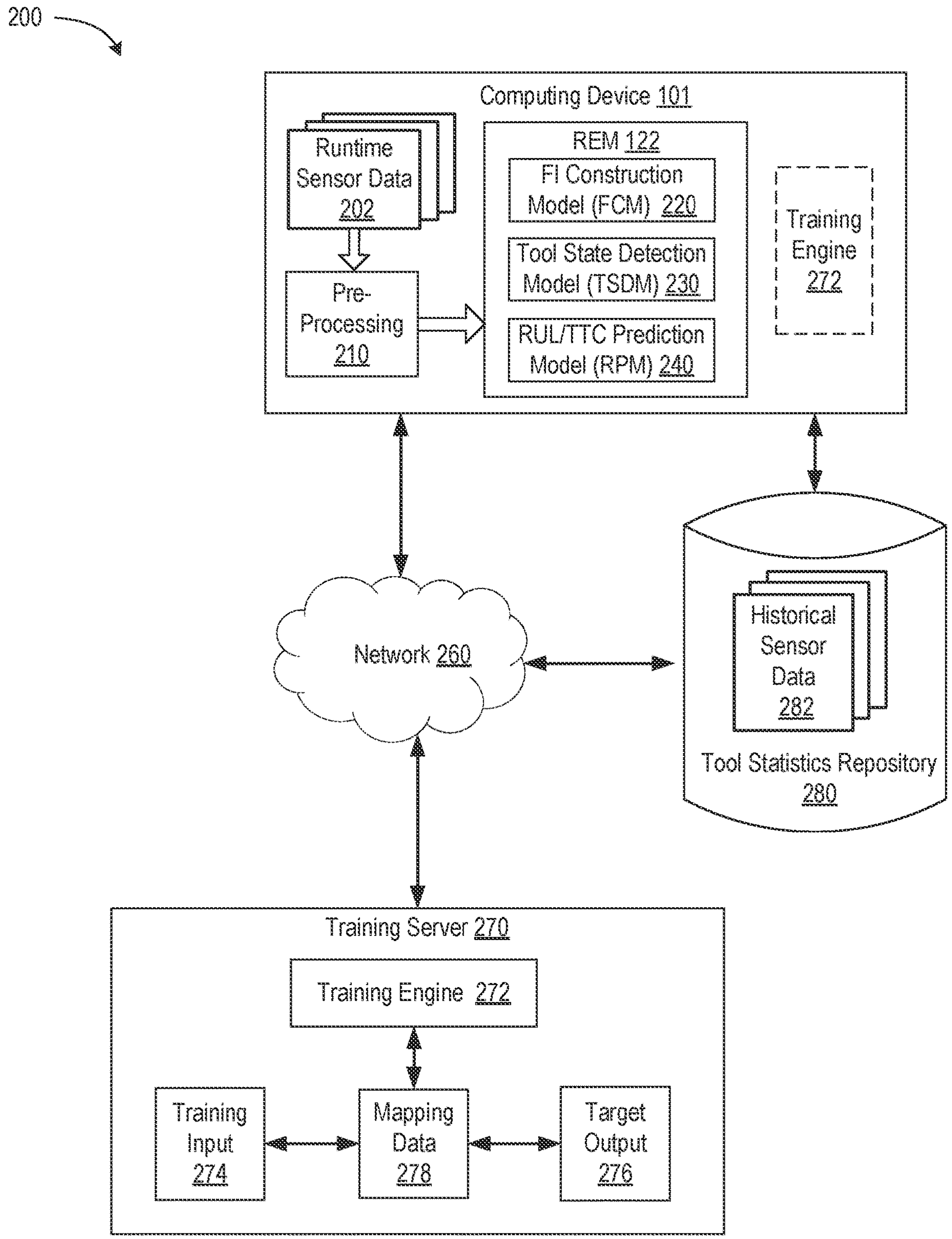
FIG. 2 is an exemplary illustration of a machine learning system capable of implementing a hybrid preventive maintenance that combines FI-based tool evaluation with accumulation of tool failure statistics, in accordance with some implementations of the present disclosure.

FIG. 2 is an exemplary illustration of a machine learning system 200 capable of implementing a hybrid preventive maintenance that combines FI-based tool evaluation with accumulation of tool failure statistics, in accordance with some implementations of the present disclosure. As illustrated, the machine learning system 200 may include a computing device 101, a tool statistics repository 280, and a training server 270 connected to a network 260. Network 260 may be a public network (e.g., the Internet), a private network (e.g., a local area network (LAN) or wide area network (WAN)), and/or a combination thereof. Depicted in FIG. 2 is a set of runtime sensor data 202 that can be generated by sensors 114 and can undergo any suitable preprocessing 210, e.g., performed by SDM 120. Preprocessing of runtime sensor data 202 may include filtering the data, e.g., identifying and removing outliers and/or artifacts in the data associated with starting a processing line being monitored, stopping the processing line, performing a maintenance of the processing line, implementing intended changes in the settings of the processing line, changes in the settings of the system hardware, and/or the like. Preprocessing of runtime sensor data 202 can further include fitting the data to one or more model distributions (e.g., the Gaussian distribution, the binomial distribution, and/or the like) and extracting mean, standard deviation, moment and/or any other statistical characteristics $$X_j^{(a)}$$

representative of runtime sensor data 202. In some embodiments, runtime sensor data 202 can include multiple sets of statistical characteristics $$\{X_j^{(a)}\},$$

e.g., with set $$\{X_j^{(1)}\}$$

corresponding to a first sensor value (e.g., temperature of the processing chamber), set $$\{X_j^{(2)}\}$$

corresponding to a second sensor value (e.g., concentration of plasma particles in the processing chamber), and so on, for any number a=1, 2, . . . . N of sensor values that correlates with and/or is representative of a current state of a particular tool (or multiple tools) being monitored. In some embodiments, runtime sensor data can further include multiple time series $$\{X_j^{(a)}(t_n)\},$$

taken at times $t_1$, $t_2$, . . . that are associated with a given sensing event.

The preprocessed data (including filtered raw data, sets of statistical characteristics of the raw data, and/or the like) can be analyzed by REM 122, which may deploy multiple machine-learning models (MLMs), including but not limited to an FI construction model (FCM) 220, a tool state detection model (TSDM) 230, a RUL/TTC prediction model (RPM) 240, and/or any other MLMs. More specifically, FCM 220 may be used to construct an FI function representative of the current state of a particular tool (or a set of multiple tools). The constructed index $$FI(\{X_j^{(a)}\})$$

may weight different sets of sensor data and/or statistical characteristics $$\{X_j^{(a)}\}$$

in view of a degree (estimated and/or learned during training) to which a respective sensor value $S^{(a)}$ is representative (relative to other sensor values) of a condition (e.g., state of deterioration) of the tool(s). In some embodiments, operation of FCM 220 can be performed prior to collection of the runtime sensor data 202. In some embodiments, operation of FCM 220 can continue during runtime processing. For example, the weights in the FI and/or FI thresholds (e.g., $T_W$, $T_A$, $T_C$, etc.) can be adjusted at runtime as tool failure data become available over a number of lifecycles of the tool(s). TSDM 230 can apply the constructed FI to runtime sensor data 202 and determine a current state of the tool(s), e.g., normal state, warning state, advanced state, and/or any other defined states. RPM 240 can be used at later stages of tool degradation, e.g., once the tool has been determined to be in the advanced state, RPM 240 can estimate how much useful life has remained of the tool(s).

FCM 220, TSDM 230, and/or RPM 240 can be trained by the training server 270. Training server 270 can be (and/or include) a rackmount server, a router computer, a personal computer, a laptop computer, a tablet computer, a desktop computer, a media center, or any combination thereof. Training server 270 can include a training engine 272. Training engine 272 can construct various modes, including machine learning models. FCM 220, TSDM 230, and/or RPM 240 can be trained by the training engine 272 using training data that includes training inputs 274, corresponding target outputs 276, and mapping data mapping training inputs 274 to target outputs 276. In some implementations, FCM 220, TSDM 230, and/or RPM 240 can be trained separately.

The training outputs 276 can include correct associations (mappings) of training inputs 274 to training outputs 276. The training engine 272 can find patterns in the training data that map the training input 274 to the training output 276 (e.g., the associations to be predicted), and train FCM 220, TSDM 230, and/or RPM 240 to capture these patterns. The patterns can subsequently be used by FCM 220, TSDM 230, and/or RPM 240 for subsequent data processing, tool state determination, and RUL/TTC determination. For example, upon receiving a new set of runtime sensor data 202, TSDM 230 and/or RPM 240 can be capable of determining a current status of one or more tools of the processing line and, if the tool(s) are nearing the end of RUL (or some other threshold condition), estimate how long the tool(s) are to remain operational.

In some embodiments, FCM 220, TSDM 230, and/or RPM 240 can include one or more neural networks, e.g., neural networks having a single or multiple layers of linear and/or non-linear neural operations. In some embodiments, FCM 220, TSDM 230, and/or RPM 240 can deploy deep neural networks having multiple levels of linear or non-linear operations. Examples of deep neural networks are neural networks including convolutional neural networks, recurrent neural networks (RNN) with one or more hidden layers, fully connected neural networks, Boltzmann machines, and so on. In some implementations, the neural networks deployed in FCM 220, TSDM 230, and/or RPM 240 can include multiple neurons, each neuron can receive its input from other neurons or from an external source and can produce an output by applying an activation function to the sum of weighted inputs and a trainable bias value. A neural network (e.g., any neural network deployed in FCM 220, TSDM 230, and/or RPM 240) can include multiple neurons arranged in layers, including an input layer, one or more hidden layers, and an output layer. Neurons from adjacent layers can be connected by weighted edges. Initially, all the edge weights can be assigned some starting (e.g., random) values. For every training input 274 in the training dataset, training engine 272 ma can y cause the neural network to generate training outputs (e.g., predicted RUL/TTC of a particular tool). The training engine can compare the observed training output of the neural network with target output 276. The resulting error, e.g., the difference between the training output and target output 276, can be propagated back through the neural network, and the weights and biases in the neural network can be adjusted to make the training output closer to target output 276. This adjustment can be repeated until the output error for a particular training input 274 satisfies a predetermined condition (e.g., falls below a predetermined value). Subsequently, a different training input 274 can be selected, a new output generated, a new series of adjustments implemented, until the neural network is trained to an acceptable degree of accuracy.

Training inputs 274 may include historical sensor data 282, which may be stored, e.g., in tool statistics repository 280, which may be accessible to the computing device 101 directly or via network 260. Historical sensor data 282 can be past statistics e.g., collected by sensors 114 of manufacturing machine 100 or similar manufacturing machines. In some embodiments, historical sensor data 282 can include runtime sensor data 202 collected during previous lifecycles of similar tool(s). Historical sensor data 282 can be annotated with the times when the tool(s) experienced a failure and/or were replaced as a result of tool degradation. Historical sensor data 282 can be further annotated with a type of the failure, an estimate of the RUL/TTC at the time of the tool replacement, and/or any other appropriate data.

Tool statistics repository 280 can be a persistent storage capable of storing sensor data or sensor data statistics as well as metadata for the stored data/statistics. Tool statistics repository 280 can be hosted by one or more storage devices, such as main memory, magnetic or optical storage disks, tapes, or hard drives, network-attached storage (NAS), storage area network (SAN), and so forth. Although depicted as separate from the computing device 101, in some implementations the training statistics repository 280 can be a part of the computing device 101. In some implementations, the training statistics repository 280 can be a network-attached file server, while in other implementations the training statistics repository 280 can be some other type of persistent storage, such as an object-oriented database, a relational database, and so forth, that can be hosted by a server machine, or one or more different machines coupled to the computing device 101 via the network 260.

Once FCM 220, TSDM 230, and/or RPM 240 have been trained, the trained models can be provided to computing device 101 for processing of new runtime sensor data 202 by REM 122. In some embodiments, a copy of training engine 272 can also be provided to computing device 101. The copy of training engine 272 can be used for training and/or retraining of some or all of FCM 220, TSDM 230, and/or RPM 240 using runtime sensor data 202. For example, as additional lifecycles of a particular tool are completed, the runtime sensor data 202 from those additional cycles can be correlated with various statistical characteristics $$\{X_j^{(a)}\}$$

and adjustments of FI weights of FCM 220, state thresholds of TSDM 230, and/or RUL/TTC metrics of RPM 240 can be performed in view of the completed lifecycles.

Any or all of FCM 220, TSDM 230, and/or RPM 240 can be deployed using one or more processing devices. "Processing device," as used herein, refers to a device capable of executing instructions encoding arithmetic, logical, or I/O operations. In one illustrative example, a processing device may follow von Neumann architectural model and can include an arithmetic logic unit (ALU), a control unit, and a plurality of registers. In a further aspect, a processing device can be a single core processor, which is typically capable of executing one instruction at a time (or process a single pipeline of instructions), or a multi-core processor which may simultaneously execute multiple instructions. In another aspect, a processing device can be implemented as a single integrated circuit, two or more integrated circuits, or can be a component of a multi-chip module. A processing device can also be referred to as a CPU. "Memory device" herein refers to a volatile or non-volatile memory, such as random-access memory (RAM), read-only memory (ROM), electrically erasable programmable read-only memory (EEPROM), or any other device capable of storing data.

Figure 3:
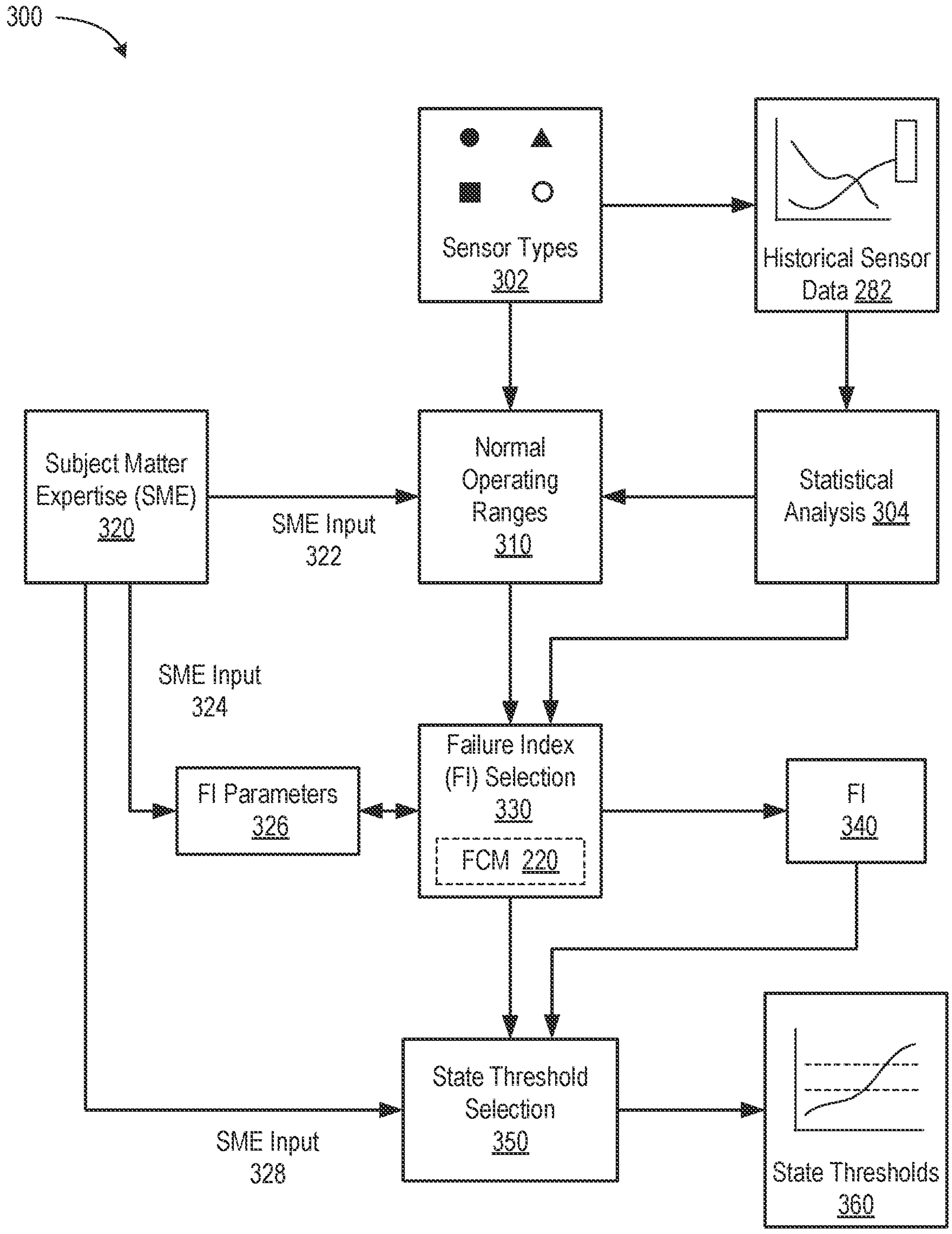
FIG. 3 is an example illustration of a failure index generation stage that facilitates hybrid preventive maintenance in manufacturing systems, in accordance with some implementations of the present disclosure.

FIG. 3 is an example illustration of a failure index generation stage 300 that facilitates integrated hybrid preventive monitoring in manufacturing systems, in accordance with some implementations of the present disclosure. In some embodiments, operations of the FI generation stage 300 can be performed using REM 122 and/or training engine 272 shown in FIG. 1 and/or FIG. 2. REM 122 (and/or training engine 272) can identify various sensor types 302 capable of providing sensor values (e.g., runtime sensor data 202) during manufacturing operations. Sensor types 302 can include optical sensors, e.g., sensors operating in visible light spectrum, UV light spectrum, IR light spectrum, and/or any other range of electromagnetic spectrum. For example, optical sensor types 302 can include reflectometry sensors, ellipsometry sensors, heterodyne sensors, spectroscopy sensors, and/or the like. Sensor types 302 can also include chemical sensors, e.g., sensors that detect chemical composition of the processing chamber environment, wafer/film composition, and the like. Sensor types 302 can further include mechanical sensors, thermal sensors, gas flow sensors, audio sensors, and/or any other types of sensors.

Using available sensor types 302, normal operating ranges 310 for various sensor values (temperature, pressure, gas flow, thickness of the polishing element, etc.) associated with performance of a specific processing tool can be established. In the following, a reference will often be made to a single tool, but it should be understood that any number of tools can be evaluated in a similar manner. For example, for some sensor value S, an optimal value $S_0$ can be identified (e.g., based on technological specification of the tool and/or the processing line). Additionally, a range of normal operations around the sensor value S, e.g., $[S_1, S_2]$, can be established, representing an acceptable departure of the sensor value from the optimal value $S_0$ as part of normal tool operations. In some embodiments, normal operating ranges 310 can be established based on observation of sensor values and sensor statistics of new tools even when no tool failure data is yet available. For example, a normal operating range $[S_1, S_2]$ for the sensor value S can established as a certain number k (e.g., k=2, 3, etc.) of standard deviations $\sigma$ from the mean sensor value $\overline{S}$ measured for a new tool: $[\overline{S}-k\sigma, \overline{S}+k\sigma]$. In some embodiments, the normal operating range need not be centered at the mean value: $[\overline{S}-k_1\sigma, \overline{S}+k_2\sigma]$, where $k_1 \neq k_2$. In some embodiments, normal operating ranges 310 of the sensor value can be established using subject matter expertise (SME) 320, e.g., a body of knowledge provided by one or more subject matter experts, including but not limited to experts in physics, chemistry, optics, and/or any other subject matter that can be related to the operations of the processing line being monitored. For example, SME 320 can provide SME input 322 that identifies the optimal value $S_0$, the bounds $[S_1, S_2]$, and/or other characteristics of the normal operating range 310.

In some embodiments, FI generation stage 300 can use historical sensor data 282 (if available) for determination of the normal operating ranges 310 of at least some of the available sensor types 302. Available historical sensor data 282 can be processed, e.g., with a statistical analysis module 304 that extracts various statistical information from historical sensor data 282, including (but not limited to) one or more of the following statistical characteristics $$X_j^{(a)}:$$

a mean value, a median value, a mode, a standard deviation, a half-width, a lower/upper bound, a skewness, a kurtosis, and/or the like. Such values can be determined for different datasets of the corresponding quantities, e.g., for datasets associated with different timestamps of historical sensor data 282. If any previous tool failure data is available (e.g., the instances when the tool failed or had to be replaced in the past), the statistical analysis module 304 can correlate the past instances of the tool failures with various features in the statistical characteristics $$\{X_j^{(a)}\}$$

extracted from historical sensor data 282.

Using the obtained correlations, the statistical analysis module 304 can perform a regression analysis and identify specific sensor values $S_a$ (generated by specific sensor types 302) that are correlated with the past tool failures. Such correlations can be characterized by a predictive power $$P_j^{(a)},$$

e.g., a numerical value computed for the respective statistical characteristics $$X_j^{(a)}$$

and quantifying a degree to which changes in $$X_j^{(a)}$$

are correlated with historic instances of the tool failures. Sensor values $S_a$ (sensor types 302) that include statistical characteristics $$X_j^{(a)}$$

having a higher predictive power $$P_j^{(a)}$$

can be identified by the statistical analysis module 304 as being more relevant for predicting future tool failures. Correspondingly, sensor values $S_a$ that have statistical characteristics $$X_j^{(a)}$$

with lower predictive powers can be identified by the statistical analysis module 304 as being less relevant for predicting future tool failures.

Predictive powers $$P_j^{(a)}$$

for various sensor data and/or their statistical characteristics $$X_j^{(a)}$$

and various sensor values $S_a$ can be communicated to a FI selection module 330 that selects a type of the FI (e.g., a linear function, a polynomial function, an exponential func tion, etc., or any combination thereof) and parameters of the FI, e.g., weights with which various sensor data and/or their statistical characteristics $$X_j^{(a)}$$

of one or more selected sensor values $S_a$ are represented in the FI. In one example non-limiting implementation, the FI can be a linear function, constructed by selecting N most predictive sensor values $S_1 \ldots S_N$, each represented with one or more (e.g., $M_a$) most relevant statistical characteristics $$X_j^{(a)},$$

$$FI = \sum_{a=1}^{N} \sum_{j=1}^{M_a} w_j^{(a)} \cdot \delta X_j^{(a)},$$

where, e.g., $$\delta X_j^{(a)}$$

represents a departure of the statistical characteristics $$X_j^{(a)}$$

from its corresponding optimal value or a normal operating range. For example, one sensor value $S_1$ can be represented in the FI by its mean $$(X_1^{(1)})$$

and variance $$(X_1^{(1)})$$

whereas another sensor value $S_2$ can be represented by only variance $$(X_1^{(2)}),$$

and so on. In some embodiments, the FI for some tools can be constructed with as few as one statistical characteristics $$X_1^{(1)}$$

of a single sensor value (single sensor type 302). In some embodiments, the FI for some tools can be constructed with tens or even hundreds (or more) of various sensor values $S_a$, each described by one or more statistical characteristics $$X_j^{(a)}.$$

In some embodiments, the selected FI can be a suitably chosen non-linear function, e.g., an exponential function, $$FI = \exp\left(\sum_{a=1}^{N} \sum_{j=1}^{M_a} w_j^{(a)} \cdot \delta X_j^{(a)}\right),$$

or a polynomial function $$FI = \sum_{a=1}^{N} \sum_{j=1}^{M_a} w_j^{(a)} \cdot \left(\delta X_j^{(a)}\right)^{\beta_j^{(a)}},$$

with suitably chosen (integer or non-integer exponents $$\beta_j^{(a)}),$$

and/or any other non-linear function.

In some embodiments, the weights $$w_j^{(a)}$$

(and/or other parameters of the FI such as exponents $\beta_a$) can be selected in view of the predictive powers $$P_j^{(a)}$$

identified by the statistical analysis module 304, e.g., can be proportional to the predictive powers $$P_j^{(a)}$$

or can be some other (e.g., non-linear) functions of the predictive powers $$P_j^{(a)}.$$

In some embodiments, various FI parameters 326 (e.g., weights $$w_j^{(a)},$$

exponents $$\beta_j^{(a)},$$

etc.) can be selected based, at least in part, on SME input 324. For example, if no significant historical sensor data 282 has been collected for a particular sensor of a new type, FI parameters 326 can be set by subject matter experts, e.g., based on mathematical/physical/chemical modeling, and the like. In some embodiments, FI parameters 326 can initially be set using statistical analysis module 304 and subsequently screened (e.g., confirmed or modified) by subject matter experts. In some embodiments, FI selection 330 can use a machine-learning model, e.g., FCM 220, trained as described in conjunction with FIG. 2. In some embodiments, FCM 220 can be pre-trained using input from subject matter experts and subsequently retrained (e.g., over several or more tool life cycles) based on collected historical sensor data 282. In some embodiments, various sensor data and/or their statistical characteristics $$X_j^{(a)}$$

can be ranked by the corresponding predictive powers $$P_j^{(a)}$$

and the ranked sensor data and/or characteristics can be provided to subject matter experts for selection into the FI (as well as for setting weights $$w_j^{(a)}$$

given to various statistical characteristics. In some embodiments, predictive powers $$P_j^{(a)}$$

may be based not only on the correlations with available historical data of tool failures, but also on historical data for the signal-to-noise ratio (SNR) of the corresponding sensor values $S_a$. For example, higher predictive power can be given to sensor values with larger ratio of the average value of $S_a$ to the standard deviation of $S_a$, e.g., $SNR=E[S_a]/\sqrt{\sigma[S_a]}$. In some embodiments, selection of the statistical characteristics for the FI can be performed iteratively. More specifically, FI selection module 330 can provide ranked statistical characteristics to the subject matter experts who select any number of those characteristics for inclusion into the FI with. Subject matter experts can further select weights to those statistical characteristics. The FI selection module 330 can subsequently correlate the selected FI with the historical data and suggest how to modify the FI to improve correlation with historical data, e.g., by including some additional sensor values/statistical characteristics of sensor values, removing some included sensor values/statistical characteristics of sensor values, modifying weights given to sensor values/statistical characteristics of sensor values, and so on. Responsive to subject matter experts modifying the FI, the FI selection module 330 can perform another iteration of correlating the new/modified FI to the historical data and providing new rankings to the subject matter experts, and so on.

After FI parameters 326 are determined during the FI selection process, the resulting FI 340 can be used for evaluation of the tool degradation. In some embodiments, a state threshold selection module 350 can define one or more thresholds $T_W$, $T_A$, etc., indicating when a state of the tool deteriorates sufficiently enough to warrant sending a notification to an operator of the processing line. More specifically, the range of the FI where $FI<T_W$ can correspond to a normal state of the tool where the operator receives no notifications. The range $T_W \le FI < T_A$, where the FI reaches or exceeds a warning threshold $T_W$ but is below an advanced threshold $T_A$, can correspond to a warning state of the tool where a notification is output to the operator indicating that the tool is approaching the end of its useful life. The range $T_A \le FI$, where the FI reaches or exceed the advanced threshold $T_A$, can correspond to the state where the tool is about to fail and where another notification may be delivered to the operator. Although this example has three states separated by two thresholds $T_W$, $T_A$, any other number of states/thresholds can be defined in some embodiments. In some embodiments, a failure threshold $T_F$ can be defined. The failure threshold may indicate a state of the tool failure, e.g., a state where the tool is expected to stop operating or providing an adequate performance. In some embodiments, the failure threshold $T_F$ need not indicate the failure of the tool, but can instead indicate a state where a tool maintenance operation is to be completed, which can include tool cleaning, recharging, recalibration, and/or the like.

In some embodiments, state threshold selection can be based on historical sensor data 282 and the analysis performed by statistical analysis module 304. For example, when at least one prior life cycle of the tool is available, the state thresholds $T_W$, $T_A$, etc., can be set based on the historical data points. For example, threshold $T_W$ can be set based on the prior tool failure data, e.g., by identifying a point where the tool has started a departure from its normal operating range. In one example, this point can correspond to a state of the tool where some representative sensor value S (or multiple sensor values) departed from the normal operating range $[S_1, S_2]$ of the respective sensor value(s) by a certain predetermined value $\Delta S$. In some embodiments, the state thresholds $T_W$, $T_A$, etc., can initially be set using on historical sensor data 282 and subsequently confirmed or adjusted using SME input 328. In some embodiments, e.g., when no historical sensor data 282 is available, the state thresholds $T_W$, $T_A$, etc., can be set (at least initially) based solely on SME input 328. The set state thresholds 360 can subsequently be used during runtime monitoring of the tool, as disclosed in more detail below in conjunction with FIG. 4.

Figure 4:
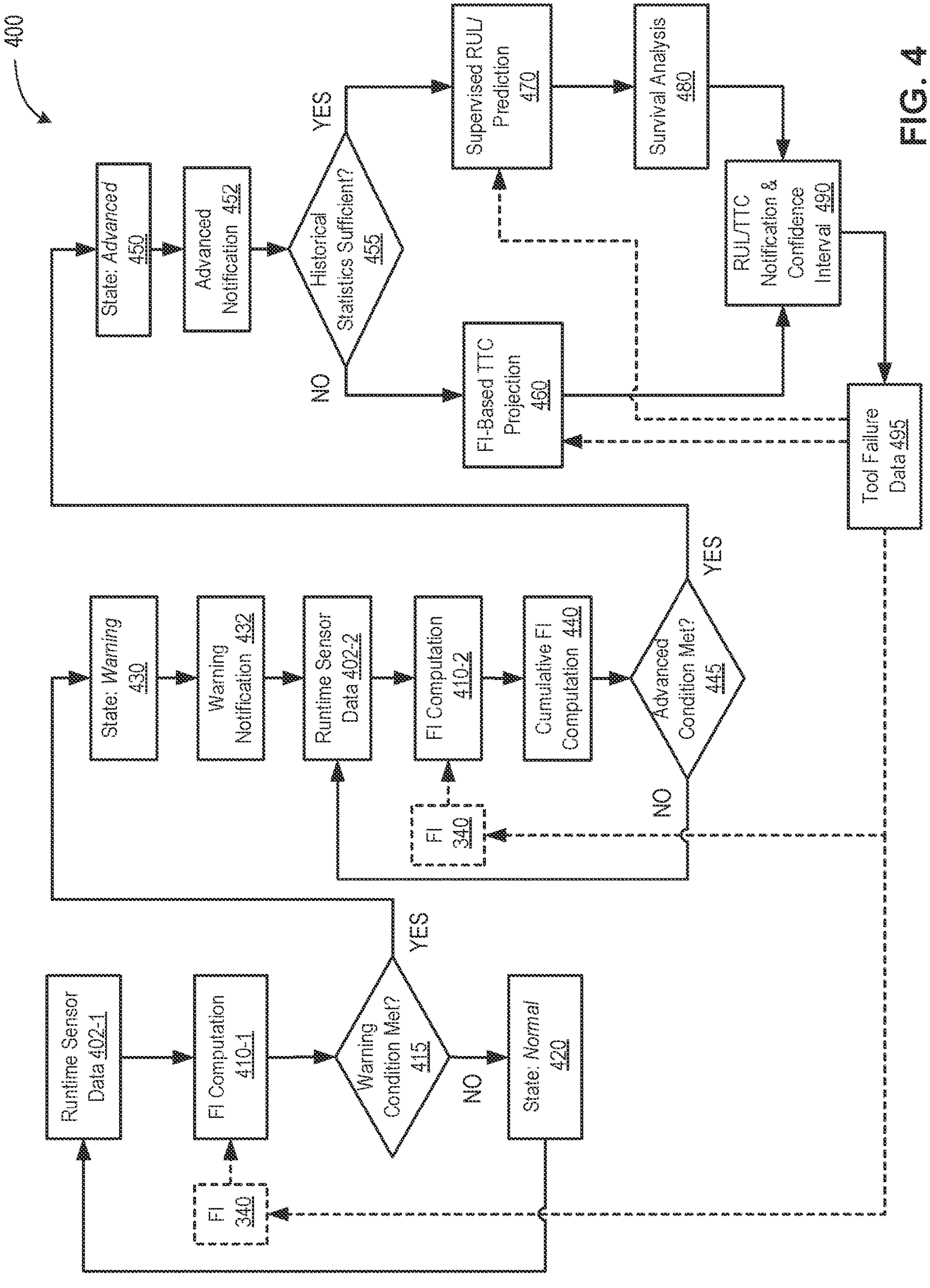
FIG. 4 is an example illustration of deployment stage of a hybrid preventive maintenance in manufacturing systems, in accordance with some implementations of the present disclosure.

FIG. 4 is an example illustration of deployment stage 400 of an integrated hybrid preventive monitoring of tools in manufacturing systems, in accordance with some implementations of the present disclosure. In some embodiments, operations of the deployment stage 400 can be performed using REM 122 illustrated in FIG. 1 and/or FIG. 2. Deployment stage 400 can be performed to evaluate a state of any tool of a manufacturing system, to estimate a RUL of the tool (or some other TTC for the tool), or to evaluate a time remaining to any reference event, e.g., maintenance of the tool, stoppage of the manufacturing process, and/or the like.

Deployment stage 400 can be performed using various predictive metrics that are specific for a particular tool or a set of tools. The predictive metrics can have been identified during execution of the failure index generation stage 300 (and/or any other suitable training stage) informed by historical sensor data 282 and/or SME 320.

Deployment stage 400 can receive runtime sensor data 402-1. Runtime sensor data 402-1 can include one or more sensor values $S_a$ collected and/or monitored by one or more sensors (e.g., sensors 114 illustrated in FIG. 1) of the selected sensor types (e.g., sensor types 302) whose data is expected (or shown, based on historical sensor data 282) to be representative of the state of degradation of the tool(s) of interest. The collected runtime sensor data 402-1 can be used for computation of the failure index (e.g., FI 340), which can be any suitable function $$FI(\{\delta X_j^{(1)}\}, \{\delta X_j^{(2)}\} \ldots ),$$

of sensor data 402-1 and/or sets of statistical characteristics of sensor data 402-1 associated with various sensing values $S_1, S_2 \ldots$ received from selected sensors. At a decision-making block 415, deployment stage 400 can determine whether a warning condition is met, e.g., whether $FI<T_W$ (the warning condition is not met) or $FI \geq T_W$ (the warning condition is met). If the warning condition is not met, the state of the tool can be determined as normal 420, indicating that the tool's performance is within a normal operating range. Deployment stage 400 can then continue with collecting additional runtime sensor data 402-1 and repeating blocks 410-1 and 415, as the tool further ages.

If the warning condition is met, the state of the tool can be determined as warning 430, indicating that the tool's performance is outside the normal operating range. A warning notification 432 can be generated and provided to an operator of the processing line, indicating that the tool is approaching the end of its useful life and may have to be replaced within a certain time (which does not have to be determined yet) or approaching any other reference event. While the tool is in the warning state, deployment stage 400 may continue with collecting the runtime sensor data 402-2 and re-computing the failure index. At decision-making block 445, deployment stage 400 can determine if an advanced condition is met, e.g., whether $FI<T_A$ (the advanced condition is not met) or $FI \geq T_A$ (the advanced condition is met).

In some embodiments, an additional function can be computed at block 440, e.g., a cumulative failure index (CFI) function. In some embodiments, the CFI can be an isotonic function of FI 340, such that the CFI tracks various increases of FI 340 but is not reset to a lower FI value even if FI 340 decreases later. For example, the CFI at timestamp $t_n$ can be determined based on the CFI value CFI $(t_{n-1})$ at the previous timestamp $t_{n-1}$ and a new value of the FI, e.g., $$CFI(t_n) = \max[FI(t_n), CFI(t_{n-1})].$$

Figure 5A:
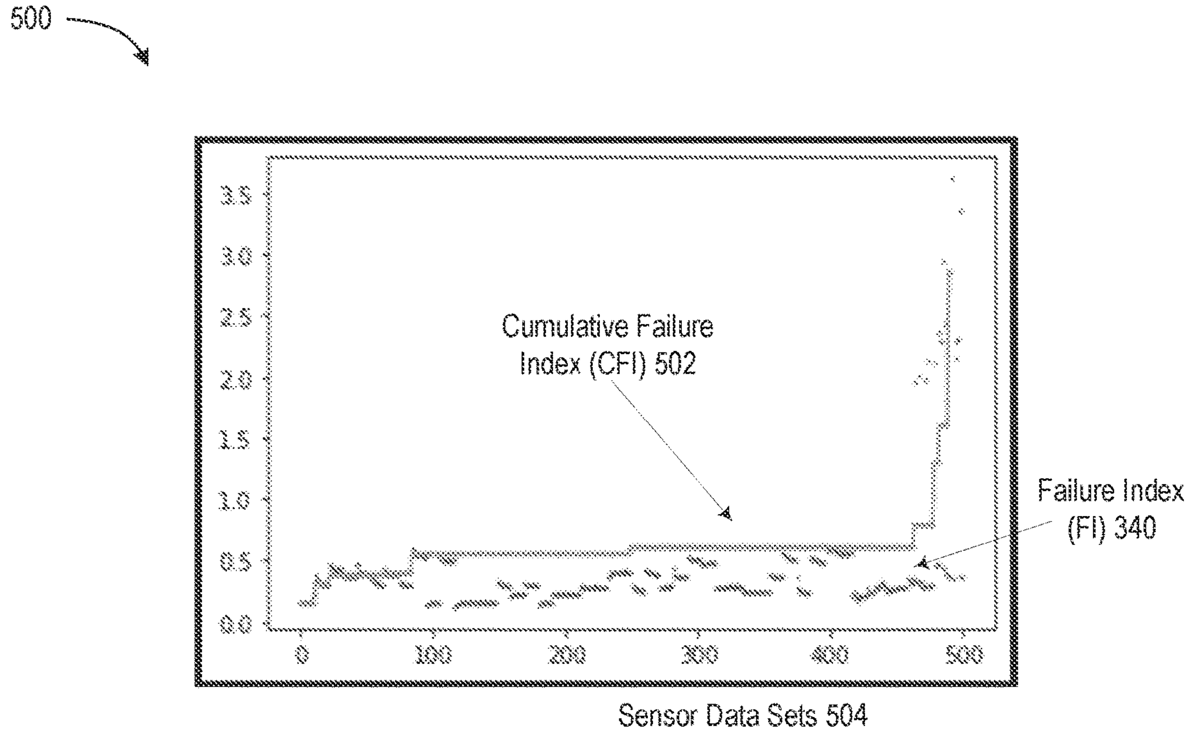
FIG. 5A illustrates an example construction of a cumulative failure index using for consecutive sensor data sets, in accordance with some implementations of the present disclosure.

Correspondingly, in some embodiments, an isotonic CFI function (or some other suitable cumulative function) can be used instead of FI 340 at the decision-making block, e.g., whether $CFI<T_A$ (the advanced condition is not met) or $CFI \geq T_A$ (the advanced condition is met). FIG. 5A illustrates an example construction 500 of a cumulative failure index (CFI) 502 using failure index FI 340 for consecutive sensor data sets 504, in accordance with some implementations of the present disclosure.

Figure 5B:
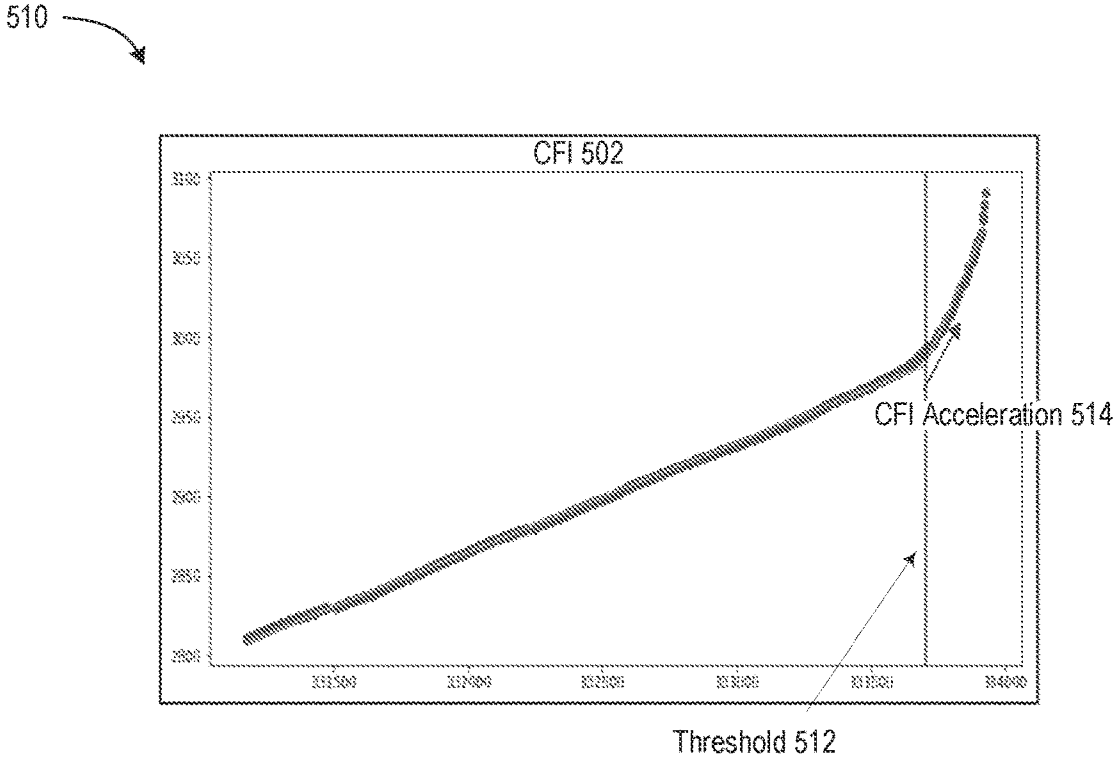
FIG. 5B illustrates an example determination of a threshold based on the cumulative failure index acceleration, in accordance with some implementations of the present disclosure.

In some embodiments, the advanced condition can involve the slope of CFI 502. For example, a discrete derivative (representing a rate of change) of the CFI 502 can be computed, $D(t_n)=CFI(t_n)-CFI(t_{n-1})$, and compared to a threshold derivative $D_T$ (which can be set using SME input 328 and/or based on historical sensor data 282, as depicted in FIG. 3). In some embodiments, a CFI acceleration above a predetermined threshold value can be used to identify the advanced state (and/or the warning state, etc.). For example, a ratio $D_2/D_1$ can be computed (e.g., using a linear fit) for one or more datasets (timestamps of sensor data), e.g., $D_2$ for one or more be a linear fit of the mean acceleration across for datasets $t_n \ldots t_{n+m}$ and $D_1$ can be a linear fit of the acceleration for earlier datasets $t_{n-1-m} \ldots t_{n-1}$. The ratio $D_2/D_1$ above a predetermined threshold value can be used as the threshold condition for the advanced (and/or any other) state of the tool. FIG. 5B illustrates an example determination 510 of a threshold 512 based on CFI acceleration 514, in accordance with some implementations of the present disclosure. Threshold 512 can be associated with any relevant condition (e.g., warning condition, advanced condition, etc.).

Numerous other metrics that are based on the FI and/or the CFI, the derivatives (first and/or higher) of the FI and/or the CFI, and or any combinations thereof can be used to identify the threshold for the advanced condition. Although FIG. 5B illustrates the use of CFI 502 to facilitate advanced state identification, CFI 502 or other similar isotonic and/or accumulation metrics can also be used to identify the warning state and/or other states of the tool(s), as can be defined under specific conditions.

Referring again to FIG. 4, if the advanced condition is not met, the state of the tool can be maintained as warning 420, indicating that the tool is outside the normal operating range but not yet in a terminal stage where the tool is to imminently break down or cease to provide acceptable performance. Consequently, deployment stage 400 can continue with collecting additional runtime sensor data 402-2 and repeating blocks 410-2, 440, and 445.

If the advanced condition is met, the state of the tool can be determined as advanced 450, indicating that the tool's failure is imminent. An advanced notification 452 can be generated and provided to the operator of the processing line, indicating that the tool is at or near the end of its RUL (or some other TTC for the tool). The deployment stage 400 can then estimate the tool's RUL/TTC. In some embodiments, the RUL/TTC of the tool can be estimated differently depending on the amount of available historical tool failure data. In those instances where at a decision-making block 455 it is determined that the tool failure data is absent (e.g., the deployment stage 400 is evaluating a new tool) or is insufficient (e.g., the amount of historical data is below a threshold), the deployment stage 400 can use an FI-based TTC projection 460. For example, at block 455 the number of historical tool failures N can be compared to a predetermined minimum number of tool failures $N_{min}$, and in the instance $N<N_{min}$, the historical statistics can be deemed insufficient.

Figure 6:
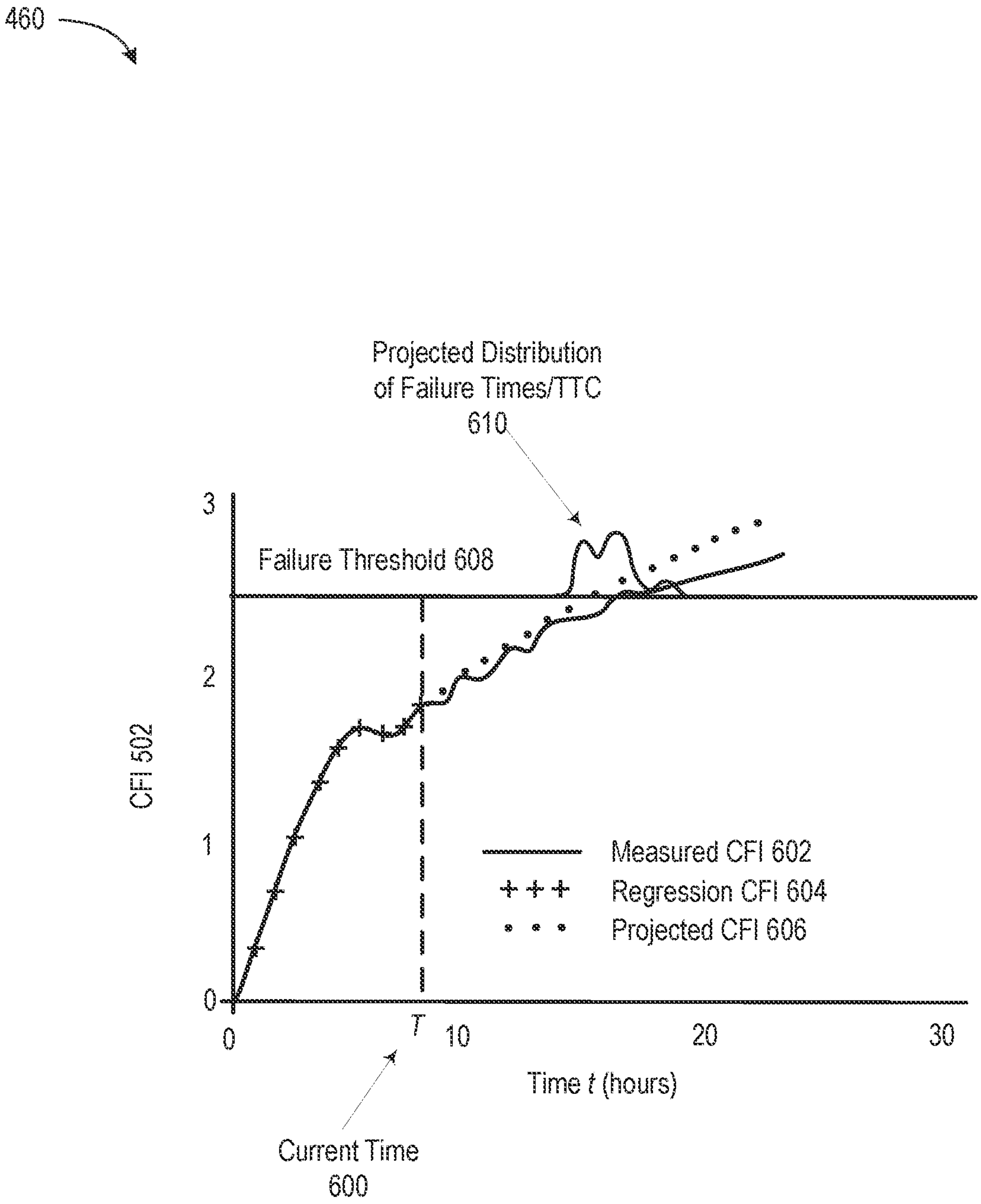
FIG. 6 illustrates schematically operations of a failure index-based projection of a remaining useful life of a tool, in accordance with some implementations of the present disclosure.

FI-based TTC projection 460 can use one or more models, e.g., mathematical models that project (interpolate) the tool's degradation state into future and determine the TTC for the tool, e.g., by determining a likely time (or an interval of times) when the projected (extrapolated) CFI(t) is to cross a failure threshold $T_F$. FIG. 6 illustrates schematically operations of FI-based TTC projection 460, in accordance with some implementations of the present disclosure. FIG. 6 depicts (in arbitrary units) an example measured CFI 602, e.g., CFI(t) computed based on the measured runtime sensor data. The projection is being performed at some current time 600, also denoted with T and indicated with the dashed line. The values CFI(t) of measured CFI 602, can be modeled (at $t \le T$) with a regression model that characterizes temporal evolution of the FI of the tool, which can include a suitable regression CFI 604, e.g., a function $CFI(t)=At^{\alpha}+Bt^{\beta}+ \ldots +\varepsilon(t)$, which include a noise term $\varepsilon(t)$ and parameters A, B, $\alpha$, $\beta$, of which one or more parameters can be regression (fitting) parameters. In some embodiments, any other regression CFI 604 can be used, with one or more non-power-law contributions, e.g., exponential contributions, logarithmic contributions, etc. The regression parameters can be determined by fitting the regression CFI 604 to the measured CFI 602. In some embodiments, at least some regression parameters can be treated as hidden stochastic variables with some distribution, e.g., a Gaussian distribution, inverse Gaussian distribution, and/or any other suitable distribution. In some embodiments, an exponential random coefficient model can be used. In some embodiments, a particle filter, a Kalman filter, or any other suitable filter can be used to recursively update the regression parameter as different times $t<T$ of sensor measurements.

The obtained regression CFI 604 with the estimated statistics of the regression parameters correctly characterizes past temporal evolution of the FI including occurrences of the warning state and/or advanced state. The regression model trained with such past predictions can be used to predict subsequent dynamics of the FI, e.g., to generate a projected CFI 606 for times $t>T$ and to determine a projected distribution of failure times 610, e.g., based on intersections of the family of projected CFI 606 (determined using the regression model) with the failure threshold $T_F$ 608. Although FIG. 6 illustrates the use of CFI 502, other failure indices (e.g., FI 340) can also be used as part of operations of FI-based TTC projection 460.

Referring again to FIG. 4, the deployment stage 400 may estimate (based on the form of the projected distribution of failure times 610) and provide, at block 490, a notification of a projected TTC and a confidence interval of the projected TTC. In some embodiments, the projected TTC can be determined based on the maximum of the projected distribution of failure times 610 and the confidence interval can be determined based on the width of this distribution.

Figure 7A:
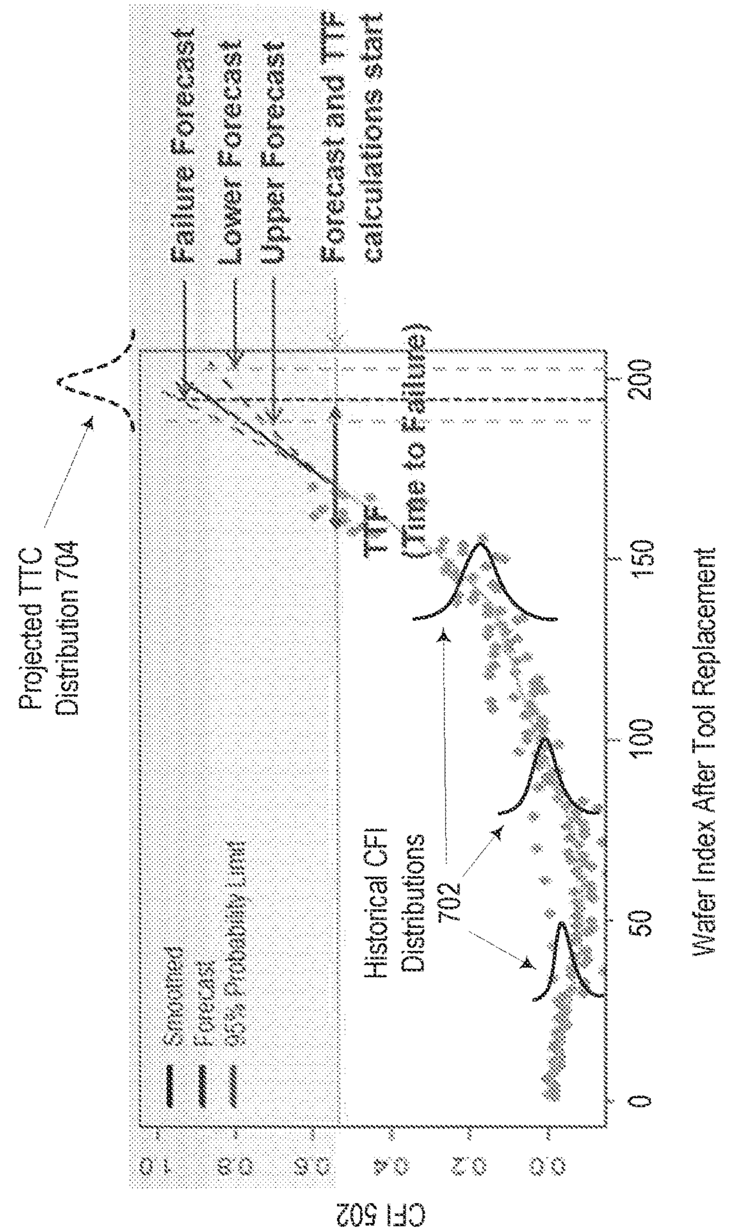
FIG. 7A illustrates schematically operations of supervised prediction of a remaining useful life of a tool, in accordance with some implementations of the present disclosure.

In those instances where the number of past tool failures N is at or above the predetermined minimum number $N_{min}$, the deployment stage 400 can use a supervised RUL prediction 470 instead of (or in addition to) the FI-based RUL projection. In some embodiments, $N_{min}$ can be a low number, e.g., $N_{min}=5$, 4, etc., or even $N_{min}=1$. FIG. 7A illustrates schematically operations of RUL prediction 470, in accordance with some implementations of the present disclosure. As depicted in FIG. 7A, historical data of past failures can be represented via CFI distributions 702, P(CFI; N), as a function of wafer index N (a number of wafers processed after a tool replacement), or any other proxy representative of a duration of the time the current instance of the tool has been in service. More specifically, $P(CFI; N)\Delta(CFI)$ may represent a historical probability that a tool had the CFI value in the interval between CFI and $CFI+\Delta(CFI)$ after the tool has been used to process N wafers. In some embodiments, CFI distributions 702 P(CFI; N) may be parameterized with some model distribution(s), such as a Gaussian distribution (parameterized via average value $\overline{CFI}$ and variance var(CFI), both of which may depend on N) or any other suitable distribution. Based on CFI distributions 702, RUL prediction 470 may compute, for a current wafer index (e.g., a number of wafers processed since the last replacement for the currently installed tool), a projected TTC distribution 704 for the current tool $P_{CUR}(N_{REM})$, e.g., a probability that the current tool will fail after $N_{REM}$ additional wafers are processed. In some embodiments, as further depicted in FIG. 7A, projected TTC distribution 704 can be used to make a number of predictions:

- The most likely number of operations that the current tool is expected to support (e.g., the number of wafers the current tool is expected to process) before tool failure $N_{MAX}=\max\{P(N_{REM})\}$.
- The average (and/or median) number of operations that the current tool is expected to support before tool failure.
- The range of the number of operations $[N_1, N_2]$ that the current tool is expected to support with a certain (first) probability $P_1$, determined from the equation, $$\sum_{N_{REM}=N_1}^{N_2} P_{CUR}(N_{REM}) = P_1.$$

In some embodiments, the sum can be replaced with an integral. In some embodiments, a suitable second condition can be imposed on $N_1$ and $N_2$, e.g., a condition that Na and $N_2$ are disposed symmetrically with respect to $N_{MAX}$ (or the average, median, or some other reference value). The range $[N_1, N_2]$ may alternatively be represented as the range of times $[T_1, T_2]$ based on the known time T per operation (e.g., per wafer processing), e.g., $T_1=TN_1$, $T_2=TN_2$.
- A minimum number of operations $N_{MIN}$ that the current tool is expected to process with a certain (second) probability $P_2$, determined from the equation, $$\sum_{N_{MIN}}^{\infty} P_{CUR}(N_{REM}) = P_2.$$

- A probability that that the current tool is expected to support at least a certain minimum number $N_{MIN}$ of operations, $$P_0 = \sum_{N_{MIN}}^{\infty} P_{CUR}(N_{REM}).$$

Numerous other predictions and metrics may be obtained from the distribution $P_{CUR}(N_{REM})$.

Figure 7B:
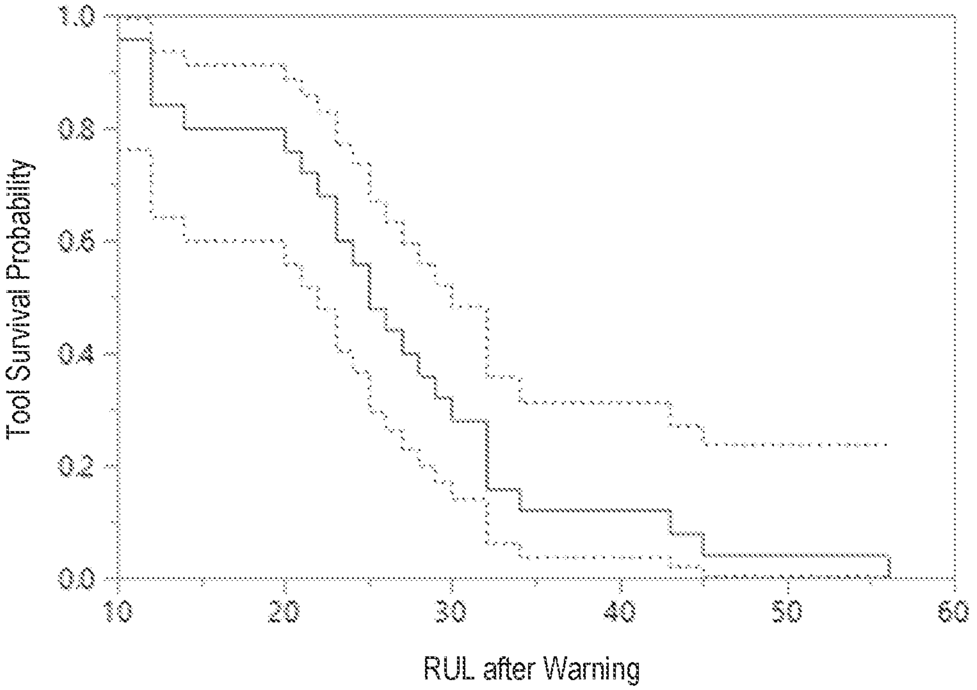
FIG. 7B-7C illustrate survival analysis operations, in accordance with some implementations of the present disclosure.
Figure 7C:
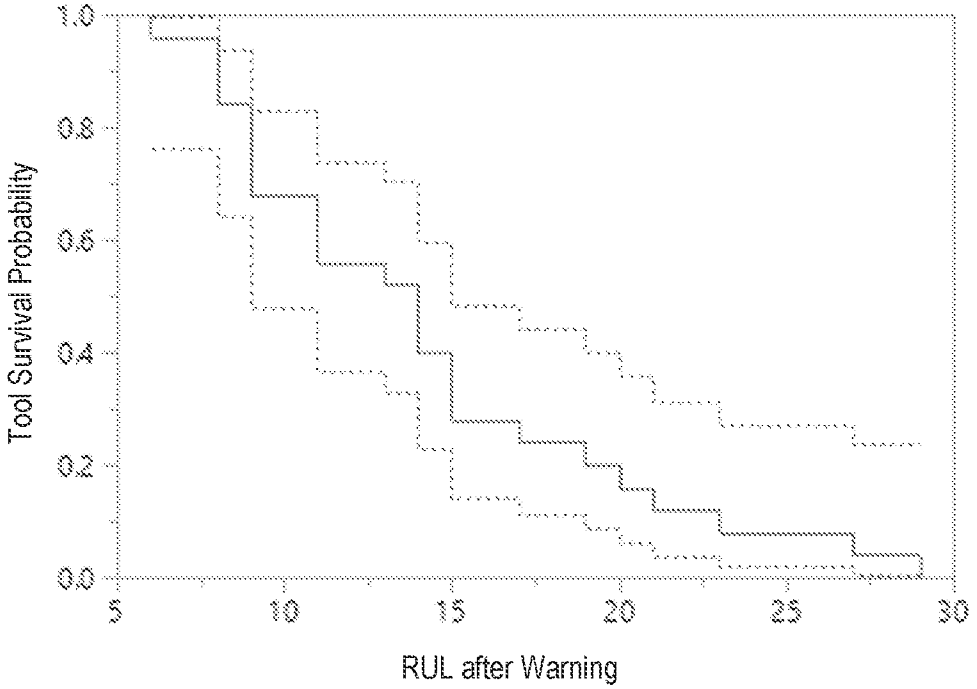

Referring back to FIG. 4, once a sufficient number of historical failures has been collected, the deployment stage 400 can include survival analysis 480, which can be performed as illustrated in FIG. 7B-C, in accordance with some implementations of the present disclosure. More specifically, each of the N past tool failures can be characterized by a time t of deterioration of the respective tool, e.g., from the beginning of the advanced deterioration state (corresponding to the CFI or FI threshold value $T_A$) to the actual failure state. A normalized distribution of the historical RULs can then be defined as the ratio $P(\tau)=\Delta N/(N\Delta\tau)$ of the fraction $\Delta N/N$ of the prior tools with the RUL within the interval [$\tau$, $\tau+\Delta\tau$] and the duration $\Delta\tau$ of the interval. RUL prediction 470 can use the probability $P(\tau)$ to estimate and provide, at block 490, a notification of a predicted RUL (e.g., determined based on the expectation value $\bar{\tau}=\int d\tau\, \tau P(\tau)$ computed using the distribution $P(\tau)$) and a confidence interval of the predicted RUL (e.g., computed based on the variance of the distribution, var $\tau=\int d\tau\, (\tau-\bar{\tau})^2 P(\tau)$).

Tools that fail and/or are replaced due to an impending failure can contribute to a tool failure data 495. For example, a tool that is replaced can be examined and the estimates of the RULs (e.g., generated by FI-based RUL prediction 470) can be verified compared to the actual state of the replaced tool. The collected tool failure data 495 can be used as the ground truth data for retraining the hybrid preventive maintenance system. More specifically, tool failure data 495 can be used (as indicated schematically with the dashed arrows in FIG. 4), for one or more of the following: adjustment of parameters of the FI 340 (e.g., weights that are assigned to different statistical characteristics and different sensor values), adjustment of thresholds (e.g., warning threshold $T_W$, advanced threshold $T_A$, failure threshold $T_F$, etc.), adjustment of distributions used to evaluate hidden variables in regression functions used by FI-based RUL prediction 470, and/or the like.

Figure 8:
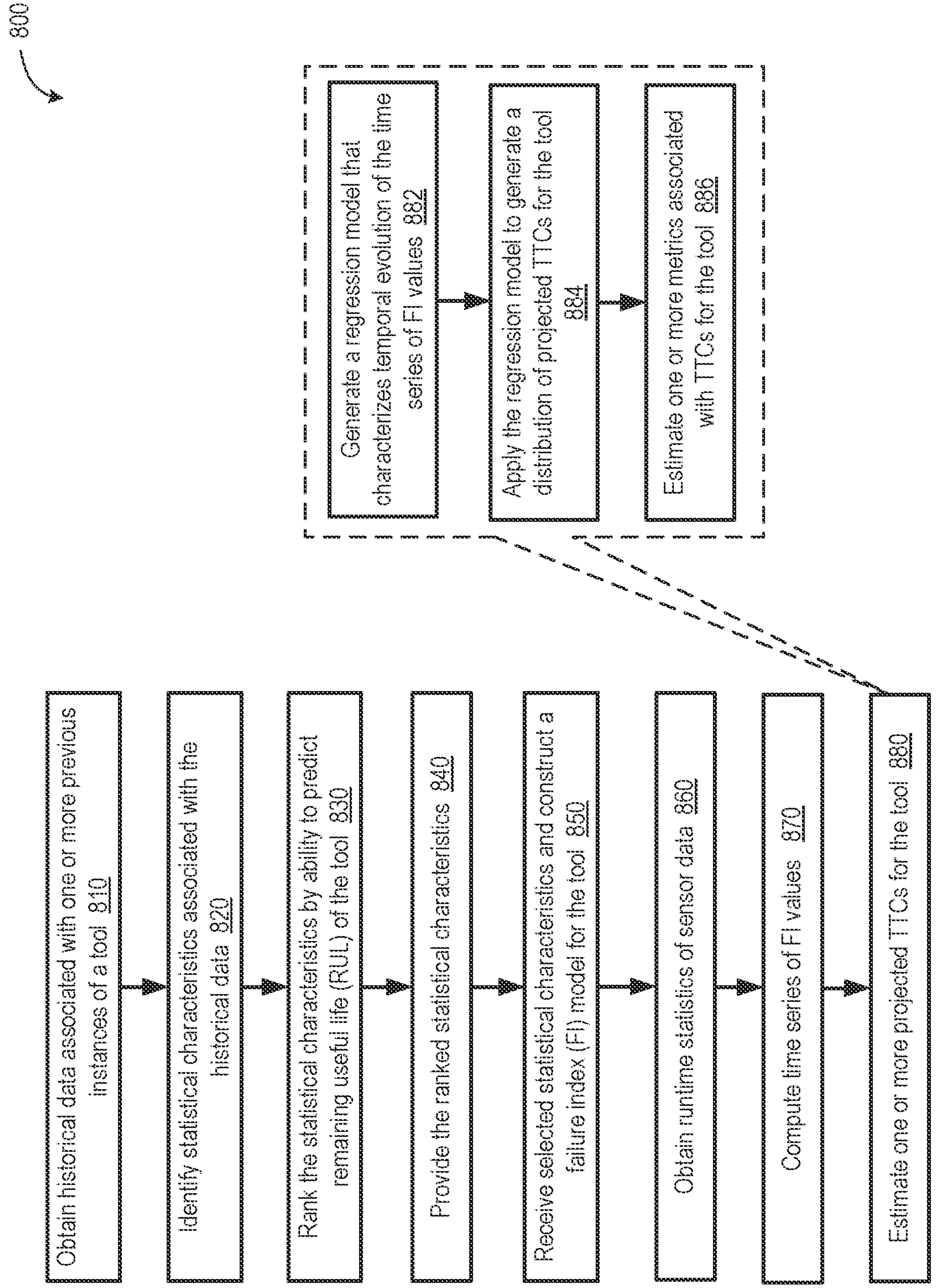
FIG. 8 is a flow diagram of an example method of a hybrid preventive maintenance in manufacturing systems performed even when insufficient amount of tool failure data is available, in accordance with some implementations of the present disclosure.
Figure 9:
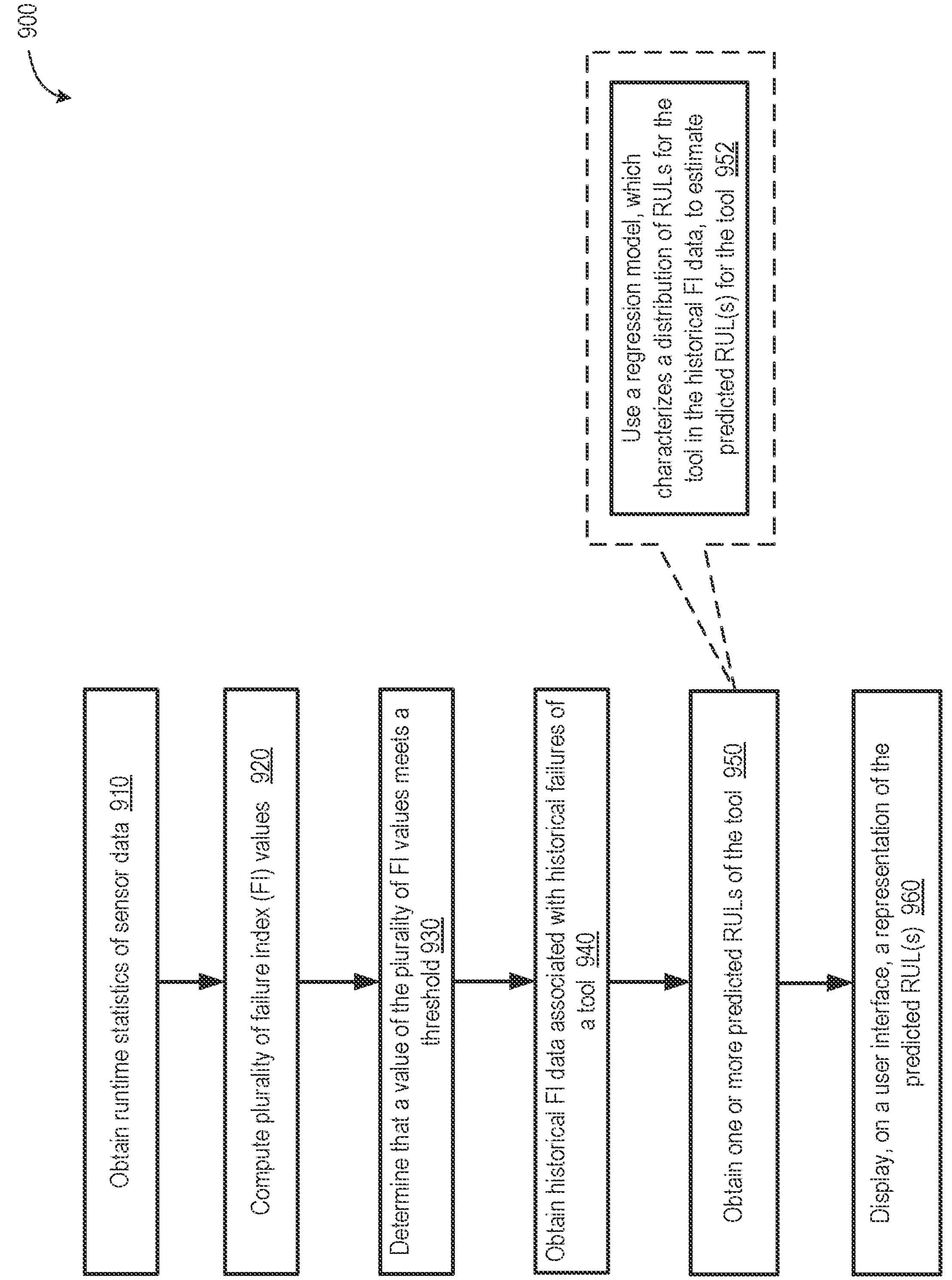
FIG. 9 is a flow diagram of an example method of a hybrid preventive maintenance in manufacturing systems performed when a sufficient amount of tool failure data is available, in accordance with some implementations of the present disclosure.

FIGS. 8-9 are flow diagrams of example methods 800-900 of integrated hybrid monitoring of tools of manufacturing system tools, in accordance with some implementations of the present disclosure. Methods 800-900 can be performed using systems and processes illustrated FIGS. 1-7 or any combination thereof. Methods 800-900 can be performed using a single processing device or multiple of processing devices. Some of the operations of methods 800-900 can be optional. In some implementations, some operations of methods 800-900 can be performed by a processing device (processor, central processing unit (CPU)) of the computing device 101, e.g., responsive to instructions output REM 122. In some implementations, some of the operations of methods 800-900 can be performed by the electronics module 150. The computing device 101 can have one or more CPUs coupled to one or more memory devices. Methods 800-900 can be performed without delaying the manufacturing process, e.g., without taking manufacturing machine 100 off the production line.

FIG. 8 is a flow diagram of an example method 800 of a hybrid preventive maintenance in manufacturing systems performed even when insufficient amount of tool failure data is available, in accordance with some implementations of the present disclosure. At block 810, method 800 can include using a computing device (e.g., computing device 101) to obtain historical data associated with one or more previous instances of a tool of a manufacturing system. Obtaining the data can include collecting the data or retrieving (from any suitable storage location) the data collected previously. At block 820, method 800 can include identifying a plurality of statistical characteristics associated with the historical data. At block 830, method 800 can include ranking the plurality of statistical characteristics by their ability to predict a remaining useful life (RUL) of the tool (or some other TTC for the tool). For example, the ranking of the statistical characteristics can be performed by correlating the corresponding statistical characteristics with historical instances of tool wear and/or tool failure. At block 840, method 800 can include providing (e.g., to a user or developer) the plurality of ranked statistical characteristics via a user interface. At block 850, method 800 can continue with receiving, via the user interface, one or more selected statistical characteristics of the plurality of statistical characteristics and constructing a failure index (FI) model associated with the tool. The constructed FI model can assign unequal weights to at least some of the selected statistical characteristics.

The one or more selected statistical characteristics can be based, at least in part, on the plurality of ranked statistical characteristics. For example, the one or more selected statistical characteristics can be user-modified, compared with the plurality of ranked statistical characteristics, in that: (1) at least one statistical characteristics of the one or more selected statistical characteristics is ranked differently compared with the plurality of ranked statistical characteristics, (2) at least one statistical characteristics of the one or more selected statistical characteristics is not included in the plurality of ranked statistical characteristics; or (3) at least one of the plurality of ranked statistical characteristics is not included in the one or more selected statistical characteristics.

At block 860, method 800 can continue with obtaining a runtime statistics of sensor data. The runtime statistics of sensor data can include the statistics collected during operations of the device manufacturing system (e.g., during wafer/film/pattern processing). Some runtime statistics can be collected during stoppages of the device manufacturing system, e.g., for maintenance or any other purpose. A set of sensors that provide sensor data can be selected (e.g., by the computing device) in view of a specific tool whose state of deterioration is being monitored. For example, the sensors can provide the statistical characteristics selected at block 850 and used by the FI model.

At block 870, method 800 can continue with computing, using the runtime statistics of sensor data, a time series of FI values, e.g., $FI(t_1)$, $FI(t_2)$, . . . . $FI(t_n)$. Computing the time series of FI values can include computing one or more of a mean, a median, a mode, a variance, a standard deviation, a range, a maximum, a minimum, a skewness, or a kurtosis of one or more quantities of the runtime statistics of the sensor data, e.g., a mean value of a first quantity (e.g., mean value of the temperature of plasma), a mean value of a second sensor quantity (e.g., mean value of plasma density), a variance of the first quantity (e.g., variance of the temperature), a variance of the second quantity (e.g., variance of plasma density), and so on. The number of statistical characteristics used in computing the time series of FI values need not be limited. In some embodiments, the time series of FI values is an isotonic time series (e.g., the CFI, as described in conjunction with FIGS. 4-6).

At block 880, method 800 can include estimating, using the time series of FI values, one or more projected TTCs of the tool. In some embodiments, method 800 can include generating one or more notifications. Such notifications can be generated responsive to a value of the time series of FI values (e.g., the most recent value) satisfying a respective threshold condition (e.g., meeting or exceeding a warning threshold, advanced threshold, and/or the like).

In some embodiments, method 800 can include, at block 882, generating, using the time series of FI values, a regression model that characterizes temporal evolution of the time series of FI values. In some embodiments, the regression model can have one or more hidden stochastic parameters whose statistics is modeled with some suitable distributions, e.g., the Gaussian distribution.

At block 884, method 800 can continue with applying the regression model to generate a distribution of one or more projected TTCs of the tool. In some embodiments, obtaining the distribution of the projected TTCs of the tool can be based on the expected probabilities of the tool reaching a failure state. At block 886, method 800 can continue with estimating one or more metrics associated with TTC for the tool. For example, the one or more metrics can include some or all of: (1) a most likely number of operations that the current tool is projected to support before tool failure, (2) an average number of operations that the current tool is projected to support before tool failure, (3) a range of the number of operations that the current tool is projected to support with a first probability, (4) a minimum number of operations that the current tool is projected to process with a second probability, (5) a third probability that that the current tool is projected to support at least a threshold minimum number of operations, and/or other suitable metrics.

In some embodiments, method 800 can include obtaining historical FI data associated with the plurality of historical failures of the tool, e.g., responsive to a number of a plurality of historical failures of the tool being above a threshold number of failures. Method 800 can then include obtaining, using the historical FI data, one or more predicted RULs for the current instance of the tool. Method 800 may also include displaying, on a user interface, a first representation of the one or more projected TTCs for the current instance of the tool and/or a second representation of the one or more predicted RULs for the current instance of the tool. As disclosed above, the predicted can be based on the time series of FI values for the current instance of the tool, whereas the projected TTCs can be based on the historical FI data for the tool. Any of the first representation and/or the second representation can include one, some, or all of the metrics referenced in conjunction with block 886 above.

FIG. 9 is a flow diagram of an example method 900 of a hybrid preventive maintenance in manufacturing systems performed when a sufficient amount of tool failure data is available, in accordance with some implementations of the present disclosure. Method 900 can include, at block 910, obtaining a runtime statistics of sensor data. Method 900 can include, at block 920, computing a plurality of FI values (e.g., time series of FI values) associated with a tool of the device manufacturing system. Operations of blocks 910-920 can be performed similarly to the blocks 860-870 of method 800.

At block 930, method 900 can include determining that a value (e.g., the latest value or some other value) of the plurality of FI values meets a threshold (e.g., warning threshold or advanced threshold). At block 940, method 900 can include obtaining a historical FI data associated with the plurality of historical failures of the tool. In some embodiments, obtaining the historical data can be responsive to the number of the plurality of historical failures of the tool being above (or at or above) a threshold number of tool failures. In some embodiments, method 900 can include generating one or more notifications. Such notifications can be generated responsive to a value of the time series of FI values (e.g., the most recent value) satisfying a respective threshold condition (e.g., meeting or exceeding a warning threshold, advanced threshold, and/or the like).

At block 950, method 900 can include obtaining, using the plurality of FI values and the historical FI data, one or more predicted RULs for the tool. In some embodiments, block 950 can include operations illustrated with the callout portion of FIG. 9. More specifically, obtaining the one or more estimated RULs for the tool can include, at block 952, using a regression model, which characterizes a distribution of predicted RULs for the tool in the historical FI data, to estimate the one or more predicted RULs for the tool.

At block 960, method 900 can include displaying, on a user interface, a representation of the one or more predicted RULs. In some embodiments, the representation of the one or more predicted RULs can include one, more, or all of the following: the most likely number of operations that the current tool is predicted to support before tool failure, an average number of operations that the current tool is predicted to support before tool failure, a range of the number of operations that the current tool is predicted to support with a first probability, a minimum number of operations that the current tool is predicted to process with a second probability, or a third probability that that the current tool is predicted to support at least a threshold minimum number of operations.

Figure 10A:
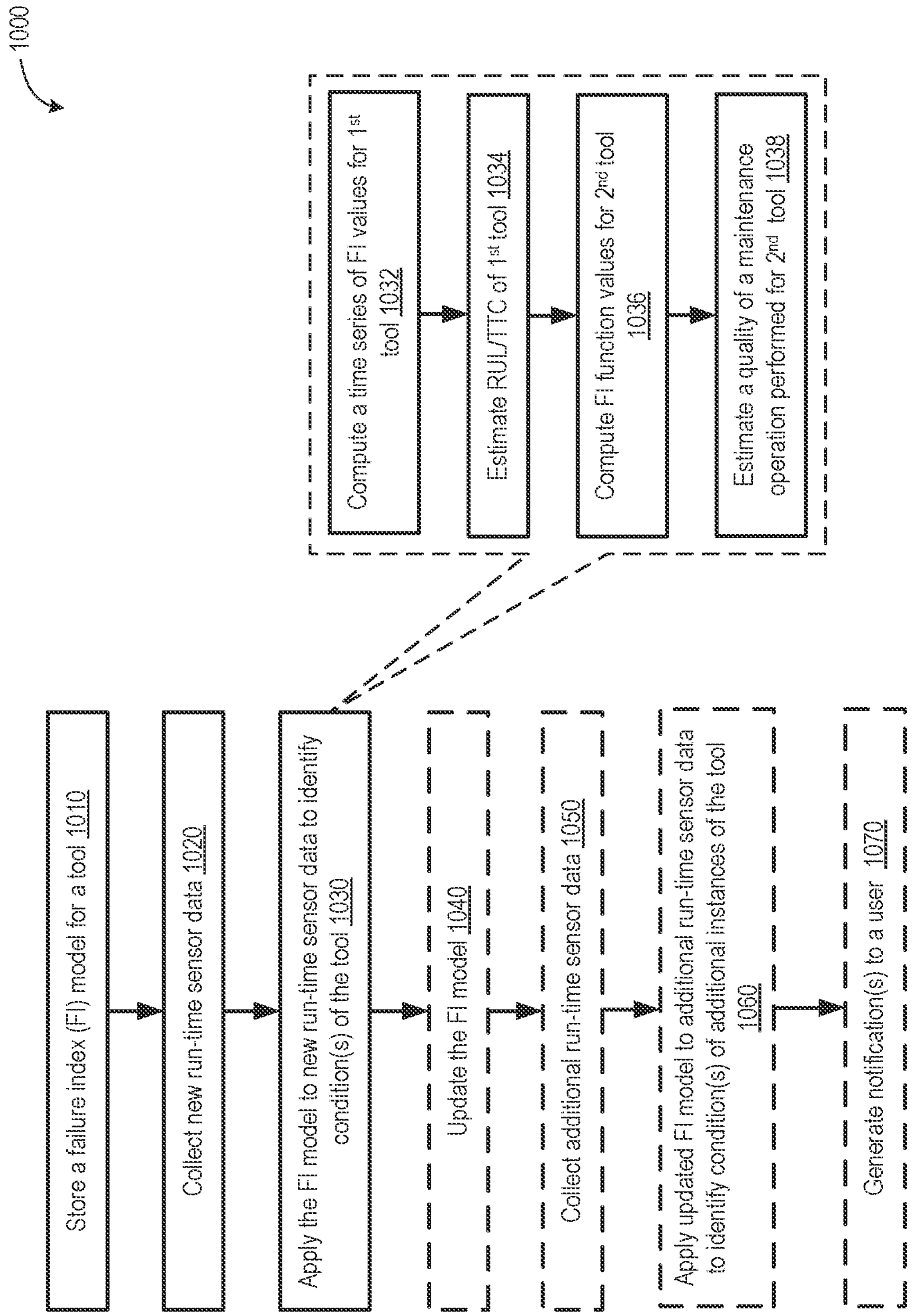
FIGS. 10A-10B depict flow diagrams of an example method of monitoring of manufacturing system tools with limited tool failure data, in accordance with some implementations of the present disclosure.
Figure 10B:
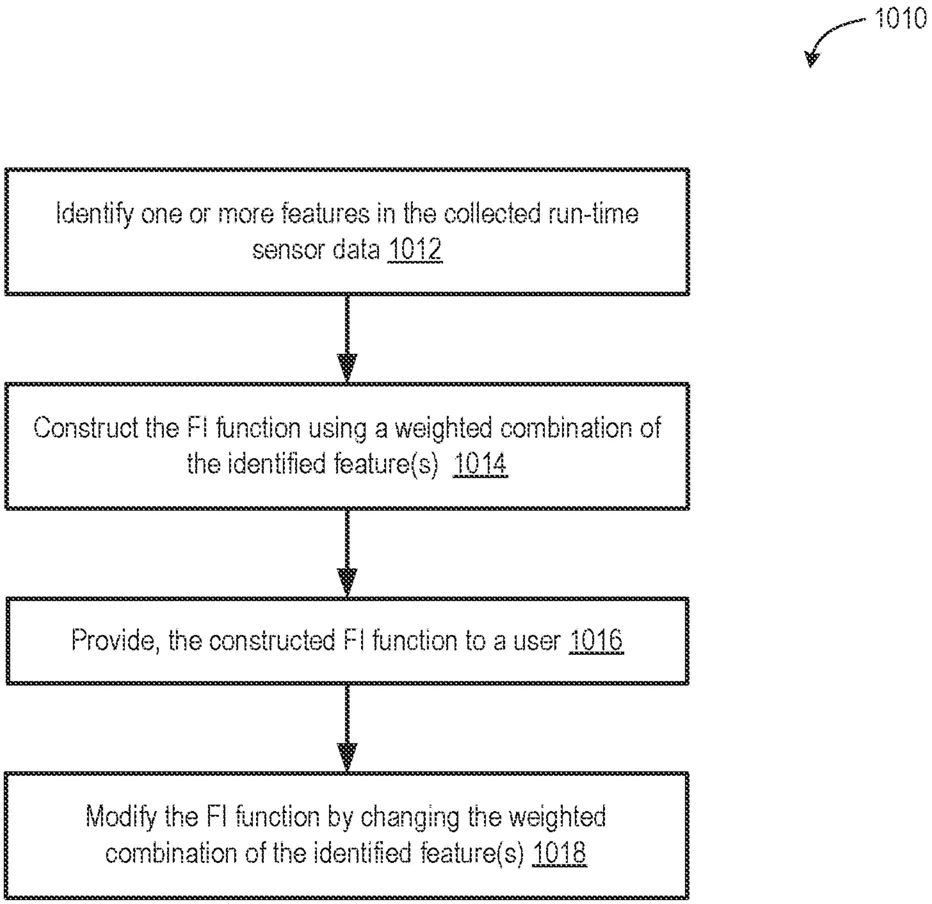

FIGS. 10A-10B depict flow diagrams of an example method 1000 of monitoring of manufacturing system tools with limited tool failure data, in accordance with some implementations of the present disclosure. Method 1000 can include, at block 1010, storing, by a processing device, a failure index (FI) model generated using run-time sensor data that was collected during one or more operations of a tool of a manufacturing system. In some implementations, the one or more operations occur prior to first five failures of the tool, prior to first three instances of the tool, prior to ten instances of the tool. In some implementations, the one or more operations can occur prior to a first failure of the tool.

The FI model can include an FI function. An input into the FI function can include the run-time sensor data. In some implementations, the FI function can include a plurality of weighted statistical characteristics of the run-time sensor data. In some implementations, the FI model can further include one or more FI threshold values for the FI function. The one or more FI threshold values can be associated with a present condition of the tool (e.g., a warning state) or with a projected condition of the tool (e.g., an advanced deterioration state expected to occur at a certain time in the future).

In some implementations, generating the FI model can include operations illustrated in FIG. 10B. More specifically, at block 1012, generating the FI model can include identifying, by the processing device, one or more features in the collected run-time sensor data. The one or more features can include at least one of: (1) a departure of a sensed quantity from a normal operating range for the sensed quantity, or (2) a departure of a derivative of the sensed quantity from a normal operating range for the derivative of the sensed quantity. At block 1014, generating the FI model can include constructing the FI function using a weighted combination of the one or more identified features. At block 1016, generating the FI model can include providing, via a user interface, the constructed FI function to a user and, at block 1018, modifying, responsive to a user input, the FI function by changing the weighted combination of the one or more identified features.

Referring again to FIG. 10A, method 1000 can include, at block 1020, collecting new run-time sensor data for one or more instances of the tool. At block 1030, method 1000 can continue with applying, by the processing device, the FI model to the new run-time sensor data to identify one or more conditions associated with each of the one or more instances of the tool.

In some embodiments, applying the FI model can include operations depicted in the callout portion of FIG. 10A. In particular, at block 1032, applying the FI model can include computing, using the run-time sensor data collected for a first instance of the tool, a time series of FI function values. At block 1034 method 1000 can continue with estimating, using the time series of FI function values, a time to threshold condition (TTC) for the first instance of the tool, e.g., a remaining useful live (RUL) of the first instance of the tool. In some implementations, estimating the TTC for the first instance of the tool can include estimating at least one of: (1) a most probable number of operations that the first instance of the tool is projected to support before a reference event, (2) an average number of operations that the first instance of the tool is projected to support before the reference event, (3) a range of a number of operations that the first instance of the tool is projected to support, before the reference event, with a first probability, (4) a minimum number of operations that the first instance of the tool is projected to process, before the reference event, with a second probability, or (3) a third probability that the first instance of the tool is projected to support at least a threshold minimum number of operations before the reference event. The reference event may be a tool failure, a tool reaching an advanced deterioration state, a tool reaching a condition where a maintenance operation is to be performed, any even associated with the technological process being performed, and/or the like.

At block 1036, method 1000 can include computing, using the run-time sensor data collected for a second instance of the tool, one or more FI function values for the second instance of the tool. At block 1038, method 1000 can include estimating, using the one or more FI function values computed for the second instance of the tool, a quality of a maintenance operation performed for the second instance of the tool. For example, the processing device performing method 1000 can determine that the FI function values computed after the maintenance operation indicate that performance of the tool has not improved to a degree expected for the maintenance operation. The processing device can then output a notification to an operator of the manufacturing system that the maintenance operation was not successful.

At block 1040, method 1000 can include updating the FI model. In some implementations, updating the FI model can be responsive to one or more tool failures of the one or more instances of the tool. In some implementations, updating the FI model can include modifying (1) a dependence of the FI function on the run-time sensor data, and/or (2) at least one FI threshold value of the one or more FI threshold values. For example, one or more tool failures can indicate that the existing FI model underestimates or overestimates degradation of the tool. Furthermore, one or more tool failures can indicate that the FI threshold values (e.g., warning, advanced, failed state, etc.) underestimates or overestimates degradation of the tool. Correspondingly, the update to the FI model can change how the FI function depends on particular run-time sensor data, remove dependence on particular run-time sensor data, add dependence on other run-time sensor data, adjust the FI threshold values, and/or the like. In some implementations, updating the FI model is responsive to a first failure of the one or more instances of the tool.

At block 1050, method 1000 can include collecting additional run-time sensor data for one or more additional instances of the tool, e.g., after the FI model update. At block 1060, method 1000 can continue with applying the updated FI model to the additional run-time sensor data to identify one or more conditions of the one or more additional instances of the tool. In some implementations, method 1000 can include generating one or more notifications to a user (block 1070). The notifications can be generated responsive to a value of the time series of FI function values satisfying a respective threshold condition of one or more threshold conditions.

Figure 11:
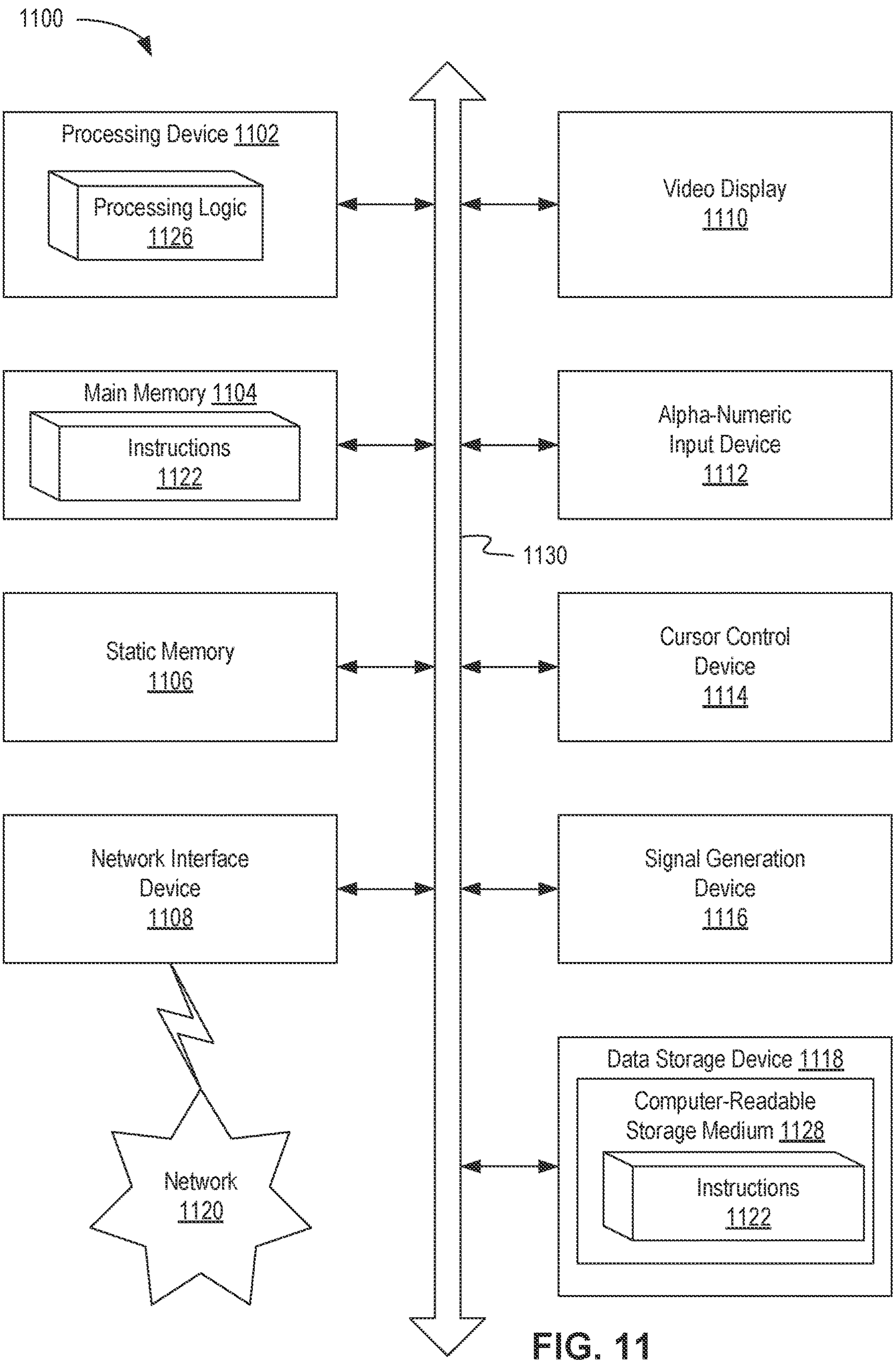
FIG. 11 depicts a block diagram of an example processing device operating in accordance with one or more aspects of the present disclosure and capable of performing a hybrid preventive maintenance, in accordance with some implementations of the present disclosure.

FIG. 11 depicts a block diagram of an example processing device 1100 operating in accordance with one or more aspects of the present disclosure and capable of performing a hybrid preventive maintenance, in accordance with some implementations of the present disclosure. The processing device 1100 can be the computing device 101 or a microcontroller of the electronics module 150 of FIG. 1, in one implementation.

Example processing device 1100 can be connected to other processing devices in a LAN, an intranet, an extranet, and/or the Internet. The processing device 1100 can be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 1100 can include a processor 1102 (e.g., a CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1118), which can communicate with each other via a bus 1130.

Processor 1102 represents one or more general-purpose processing devices such as a microprocessor, central processing unit, or the like. More particularly, processor 1102 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 can include processing logic 1126 and can be one or more special-purpose processing devices such as an application specific integrated circuit (ASIC), a field programmable gate array (FPGA), a digital signal processor (DSP), network processor, or the like. In accordance with one or more aspects of the present disclosure, processor 1102 can be configured to execute instructions implementing methods 800-1000 of preventive maintenance and tool state monitoring in manufacturing systems.

Example processing device 1100 can further comprise a network interface device 1108, which can be communicatively coupled to a network 1120. Example processing device 1100 can further comprise a video display 1110 (e.g., a liquid crystal display (LCD), a touch screen, or a cathode ray tube (CRT)), an alphanumeric input device 1112 (e.g., a keyboard), an input control device 1114 (e.g., a cursor control device, a touch-screen control device, a mouse), and a signal generation device 1116 (e.g., an acoustic speaker).

Data storage device 1118 can include a computer-readable storage medium (or, more specifically, a non-transitory computer-readable storage medium) 1128 on which is stored one or more sets of executable instructions 1122. In accordance with one or more aspects of the present disclosure, executable instructions 1122 can comprise executable instructions implementing methods 800-1000 of preventive maintenance and tool state monitoring in manufacturing systems.

Executable instructions 1122 can also reside, completely or at least partially, within main memory 1104 and/or within processor 1102 during execution thereof by example processing device 1100, main memory 1104 and processor 1102 also constituting computer-readable storage media. Executable instructions 1122 can further be transmitted or received over a network via network interface device 1108.

While the computer-readable storage medium 1128 is shown in FIG. 11 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above can be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics can be combined in any suitable manner in one or more implementations.

In the foregoing specification, a detailed description has been given with reference to specific exemplary implementations. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but can refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:

storing, by a processing device, a failure index (FI) model that comprises:

an FI function computing a plurality of weighted statistical characteristics of run-time sensor data collected during one or more operations of a tool of a manufacturing system, each statistical characteristic of the plurality of weighted statistical characteristics weighted with a respective weight of a plurality of weights of the FI function, and one or more FI threshold values for the FI function, wherein each of the one or more FI threshold values is associated with at least one of a present condition of the tool or a projected condition of the tool, wherein the plurality of weights and the one or more FI threshold values are initially set, prior to first five failures of the tool, based on input received from a user;

collecting run-time sensor data for one or more instances of the tool;

applying, by the processing device, the FI model to the run-time sensor data to identify one or more conditions associated with each of the one or more instances of the tool;

responsive to one or more tool failures of the one or more instances of the tool, updating the FI model using the run-time sensor data, wherein updating the FI model comprises modifying one or more of:

at least one weight of the plurality of weights of the FI function, or at least one FI threshold value of the one or more FI threshold values; and outputting, via a user interface, one or more notifications generated by the updated FI model responsive to a value of the FI function satisfying a respective FI threshold value of the one or more FI threshold values, wherein each of the one or more notifications identifies a condition associated with a physical condition of at least one additional instance of the tool.

2. The method of claim 1, wherein the run-time sensor data is collected prior to a first failure of the tool.

3. The method of claim 1, wherein updating the FI model is responsive to a first failure of the one or more instances of the tool.

4. The method of claim 1, further comprising:

collecting additional run-time sensor data for one or more additional instances of the tool; and applying the updated FI model to the additional run-time sensor data to identify one or more conditions of the one or more additional instances of the tool.

5. The method of claim 1, wherein the FI model is initially configured using operations comprising:

identifying, by the processing device, one or more features in the collected run-time sensor data, wherein the one or more features comprise at least one of:

a departure of a sensed quantity from a normal operating range for the sensed quantity, or a departure of a derivative of the sensed quantity from a normal operating range for the derivative of the sensed quantity; and constructing the FI function using a weighted combination of the one or more identified features, wherein the weighted combination is initially set based on the input received from a user.

6. The method of claim 5, further comprising:

providing, via the user interface, the constructed FI function to a user; and responsive to a user input, modifying, by the processing device, the FI function by changing the weighted combination of the one or more identified features.

7. The method of claim 1, wherein applying the FI model to the run-time sensor data collected for a first instance of the tool of the one or more instances of the tool comprises:

computing, using the run-time sensor data collected for the first instance of the tool, a time series of FI function values; and estimating, using the time series of FI function values, a time to a threshold condition (TTC) for the first instance of the tool.

8. The method of claim 7, wherein applying the FI model to the run-time sensor data collected for a second instance of the tool of the one or more instances of the tool comprises:

computing, using the run-time sensor data collected for the second instance of the tool, one or more FI function values for the second instance of the tool; and estimating, using the one or more FI function values computed for the second instance of the tool, a quality of a maintenance operation performed for the second instance of the tool.

9. The method of claim 7, wherein estimating the TTC for the first instance of the tool comprises estimating at least one of:

a most probable number of operations that the first instance of the tool is projected to support before a reference event;

an average number of operations that the first instance of the tool is projected to support before the reference event;

a range of a number of operations that the first instance of the tool is projected to support, before the reference event, with a first probability;

a minimum number of operations that the first instance of the tool is projected to process, before the reference event, with a second probability; or a third probability that the first instance of the tool is projected to support at least a threshold minimum number of operations before the reference event.

10. The method of claim 7, further comprising:

generating one or more notifications to a user, wherein each of the one or more notifications is generated responsive to a value of the time series of FI function values satisfying a respective threshold condition of one or more threshold conditions.

11. The method of claim 7, wherein the time series of FI function values is an isotonic time series.

12. A non-transitory computer-readable medium storing instructions that, when executed by a processing device, cause the processing device to perform operations comprising:

storing, by the processing device, a failure index (FI) model that comprises:

an FI function computing a plurality of weighted statistical characteristics of run-time sensor data collected during one or more operations of a tool of a manufacturing system, each statistical characteristic of the plurality of weighted statistical characteristics weighted with a respective weight of a plurality of weights of the FI function, and one or more FI threshold values for the FI function, wherein each of the one or more FI threshold values is associated with at least one of a present condition of the tool or a projected condition of the tool, wherein the plurality of weights and the one or more FI threshold values are initially set, prior to a first failure of the tool, based on input received from a user;

collecting run-time sensor data for one or more instances of the tool;

applying the FI model to the run-time sensor data to identify one or more conditions associated with each of the one or more instances of the tool;

outputting, via a user interface, one or more notifications responsive to a value of the FI function satisfying a respective FI threshold value of the one or more FI threshold values, wherein each of the one or more notifications identifies a condition associated with a physical condition of at least one instance of the tool; and responsive to a first failure of the tool, updating the FI model using the run-time sensor data, wherein updating the FI model comprises modifying one or more of:

at least one weight of the plurality of weights of the FI function, or at least one FI threshold value of the one or more FI threshold values.

13. A system comprising:

a memory; and a processing device operatively coupled to the memory, the processing device to:

store a failure index (FI) model that comprises:

an FI function computing a plurality of weighted statistical characteristics of run-time sensor data collected during one or more operations of a tool of a manufacturing system, each statistical characteristic of the plurality of weighted statistical characteristics weighted with a respective weight of a plurality of weights of the FI function, and one or more FI threshold values for the FI function, wherein each of the one or more FI threshold values is associated with at least one of a present condition of the tool or a projected condition of the tool, wherein the plurality of weights and the one or more FI threshold values are initially set, prior to first five failures of the tool, based on input received from a user;

collect run-time sensor data for one or more instances of the tool;

apply the FI model to the run-time sensor data to identify one or more conditions associated with each of the one or more instances of the tool;

responsive to one or more tool failures of the one or more instances of the tool, update the FI model using the run-time sensor data, wherein updating the FI model comprises modifying one or more of:

at least one weight of the plurality of weights of the FI function, or at least one FI threshold value of the one or more FI threshold values; and output, via a user interface, one or more notifications responsive to a value of the FI function satisfying a respective FI threshold value of the one or more FI threshold values, wherein each of the one or more notifications identifies a condition associated with a physical condition of at least one additional instance of the tool.

14. The system of claim 13, wherein the run-time sensor data is collected prior to a first failure of the tool.

15. The system of claim 13, wherein the processing device is to update the FI model responsive to a first failure of the one or more instances of the tool.

16. The system of claim 13, wherein to initially configure the FI model, the processing device is to:

identify one or more features in the collected run-time sensor data, wherein the one or more features comprise at least one of:

a departure of a sensed quantity from a normal operating range for the sensed quantity, or a departure of a derivative of the sensed quantity from a normal operating range for the derivative of the sensed quantity; and construct the FI function using a weighted combination of the one or more identified features, wherein the weighted combination is initially set based on input received from a user.

17. The system of claim 13, wherein to apply the FI model to the run-time sensor data collected for a first instance of the tool of the one or more instances of the tool, the processing device is to:

compute, using the run-time sensor data collected for the first instance of the tool, a time series of FI function values; and estimate, using the time series of FI function values, a time to a threshold condition (TTC) for the first instance of the tool.

18. The system of claim 17, wherein to estimate the TTC for the first instance of the tool, the processing device is to estimate at least one of:

a most probable number of operations that the first instance of the tool is projected to support before a reference event;

an average number of operations that the first instance of the tool is projected to support before the reference event;

a range of a number of operations that the first instance of the tool is projected to support, before the reference event, with a first probability;

a minimum number of operations that the first instance of the tool is projected to process, before the reference event, with a second probability; or a third probability that the first instance of the tool is projected to support at least a threshold minimum number of operations before the reference event.

* * * * *